United States Patent
Ricanek, Jr. et al.

(10) Patent No.: US 9,317,740 B2
(45) Date of Patent: *Apr. 19, 2016

(54) DEMOGRAPHIC ANALYSIS OF FACIAL LANDMARKS

(71) Applicant: University of North Carolina at Wilmington, Wilmington, NC (US)

(72) Inventors: Karl Ricanek, Jr., Wilmington, NC (US); Yishi Wang, Wilmington, NC (US); Yaw Chang, Wilmington, NC (US); Cuixian Chen, Wilmington, NC (US)

(73) Assignee: University of North Carolina at Wilmington, Wilmington, NC (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/560,771

(22) Filed: Dec. 4, 2014

(65) Prior Publication Data

US 2015/0086087 A1 Mar. 26, 2015

Related U.S. Application Data

(63) Continuation of application No. 13/627,687, filed on Sep. 26, 2012, now Pat. No. 8,913,839.

(60) Provisional application No. 61/539,724, filed on Sep. 27, 2011.

(51) Int. Cl.
*G06K 9/00* (2006.01)
*G06T 11/20* (2006.01)

(52) U.S. Cl.
CPC ........ *G06K 9/00288* (2013.01); *G06K 9/00221* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 5,781,650 | A | 7/1998 | Lobo et al. |
| 5,835,616 | A | 11/1998 | Lobo et al. |
| 7,319,779 | B1 | 1/2008 | Mummareddy et al. |
| 7,505,621 | B1 | 3/2009 | Agrawal et al. |
| 7,912,246 | B1 | 3/2011 | Moon et al. |
| 8,000,505 | B2 | 8/2011 | Gallagher |

(Continued)

OTHER PUBLICATIONS

Bäck, "Selective Pressure in Evolutionary Algorithms: A Characterization of Selection Mechanisms," 1994, Evolutionary Computation, 1994. IEEE World Congress on Computational Intelligence., Proceedings of the First IEEE Conference on, pp. 57-62.*

(Continued)

*Primary Examiner* — David F Dunphy
(74) *Attorney, Agent, or Firm* — McDonnell Boehnen Hulbert & Berghoff LLP

(57) ABSTRACT

A set of training vectors may be identified. Each training vector may be mapped to either a male gender or a female gender, and each training vector may represent facial landmarks derived from a respective facial image. An input vector of facial landmarks may also be identified. The facial landmarks of the input vector may be derived from a particular facial image. A feature vector may containing a subset of the facial landmarks may be selected from the input vector. A weighted comparison may be performed between the feature vector and each of the training vectors. Based on a result of the weighted comparison, the particular facial image may be classified as either the male gender or the female gender.

18 Claims, 31 Drawing Sheets

(56) References Cited

U.S. PATENT DOCUMENTS

| | | | |
|---|---|---|---|
| 8,379,937 | B1 | 2/2013 | Moon et al. |
| 2005/0111737 | A1* | 5/2005 | Das et al. ............... 382/190 |
| 2010/0066822 | A1 | 3/2010 | Steinberg et al. |
| 2011/0249891 | A1* | 10/2011 | Li .......................... 382/165 |

OTHER PUBLICATIONS

Sun et al, "Genetic Feature Subset Selection for Gender Classification: A Comparison Study," 2002, A comparison study. Applications of Computer Vision, 2002.(WACV 2002). Proceedings. Sixth IEEE Workshop on, pp. 1-6.*
Zhu et al, "Towards a Memetic Feature Selection Paradigm," 2010, IEEE Computational Intelligence Magazine, pp. 41-53.*
Chen et al, "Face Age Estimation Using Model Selection," 2010, Computer Vision and Pattern Recognition Workshops (CVPRW), 2010 IEEE Computer Society Conference on, pp. 93-99.*
IEEE Xplore Digital Library [online], [retrieved on Jun. 25, 2015]. Retrieved from the Internet <URL: http://ieeexplore.ieee.org/xpl/mostRecentIssue.jsp?punumber=5521877
&punumber%3D5521877%26filter%3DAND%28p_IS_
Number%3A5543135%29%26pageNumber%3D2
&pageNumber=3 >, pp. 1-4.*
Amayeh, G. et al., "Gender classification from hand shape," IEEE Computer Society Conference on Computer Vision and Pattern Recognition Workshops, 2008, pp. 1-7.
Badawi, A. et al., "Fingerprint-based gender classification," 2006, pp. 1-6.
Baluja, S. et al., "Boosting sex identification performance," IJCV, Jan. 2007, pp. 111-119, vol. 71, No. 1.
Breiman, L., "Random forests," Machine Learning, 2001, pp. 5-32, vol. 45, No. 1.
Buchala, S. et al., "Gender classification of face images: The role of global and feature-based information," Proceeding of ICONIP 2004, 2004, pp. 763-768, vol. 3316.
Chang et al., "Improved Image-based Automatic Gender Classification by Feature Selection," JAISCR, 2011, pp. 241-253 vol. 1, No. 3.
Chang et al., "Feature Selection for Improved Automatic Gender Classification," Computational Intelligence in Biometrics and Identity Management (CIBIM), 2011 IEEE, Apr. 11-15, 2011, pp. 1-7.
Feret database. http://www.itl.nist.gov/iad/humanid/feret/, Oct. 15, 2012, 5 pages.
Fg-net aging database, http:/www.fgnet.rsunit.com, Oct. 15, 2012, 1 page.
Gao, W. et al., "Face gender classification on consumer images in a multiethnic environment," Lectures Notes in Computer Science, 2009, pp. 169-178, vol. 5558.
Golomb L.D.T. et al., "Sexnet: A neural network identifies sex from human faces," Advances in Neural Information Processing Systems, R.P. Lippman, J. Moody, and D.S. Touretzky, eds., 1991, pp. 572-577, vol. 3.
Guo, G.D. et al., "Is gender recognition influenced by age?" IEEE International Workshop on Human-Computer Interaction (HCI'09), in conjunction with ICCV'09, 2009, pp. 2032-2039.
Gutta, S. et al., "Gender and ethnic classification of human faces using hybrid classifiers," International Joint Conference on Neural Networks (IJCNN'99), 1999, pp. 4084-4089, vol. 6.
Guyon, I., "An introduction to variable and feature selection," Journal of Machine Learning Research, 2003, pp. 1157-1182 , vol. 3.
Guyon, I. et al., "Gene selection for cancer classification using support vector machines," Mach. Learn., 2002, pp. 389-422, vol. 46, Nos. 1-3.
Hadid, A. et al., "Manifold learning for gender classification from face sequences," Lecture Notes in Computer Science, 2009, pp. 82-91, vol. 5558.
Harb, H. et al., "Gender identification using a general audio classifier," Proc. Int. Conf. on Multimedia and Expo, ICME 2003, pp. 733-336, vol. 2.
He, X. et al., "Locality preserving projections," Proceedings of Advances in Neural Information Processing Systems, 2003, pp. 1-8.
Keyvanrad, M. et al., "Feature selection and dimension reduction for automatic gender identification," 14th International Computer Conference (SCICC 200( ) pp. 613-618 (Oct. 20-21, 2009).
Lee, L. et al., "Gait analysis for recognition and classification," Fifth IEEE International Conference on Automatic Face and Gesture Recognition, pp. 148-155 (2002).
Makinen, E. et al., "Evaluation of gender classification methods with automatically detected and aligned faces," IEEE Transactions on Pattern Analysis and Machine Intelligence, 30(3):541-547, Mar. 2008.
Merz, P. et al., "A comparison of memetic algorithms, tabu search, and ant colonies for the quadratic assignment problem," Proc. of the 1999 Congress on Evolutionary Computation, IEEE, pp. 2063-2070, Press.1999.
Miller, P.E. et al., "Personal identification using periocular skin texture," SAC 10: Proceedings of the 2010 ACM Symposium on Applied Computing, pp. 1496-1500 (2010).
Minear, M. et al., "A lifespan database of adult facial stimuli," Behavior Research Methods, Instruments, & Computers, vol. 36, No. 4, pp. 630-633 (2004).
Moghaddam, B. et al., "Learning gender with support faces," IEEE Trans. Pattern Anal. Mach. Intell., vol. 24,No. 5, pp. 707-711 (2002).
Moscato, P. et al., "On evolution, search, optimization, genetic algorithms and martial arts—towards memetic algorithms," Caltech Concurrent Computation Program 158-79, California Institute of Technology, Pasadena, CA, 1989.
Müller, Ronald, "A System for Automatic Face Analysis Based on Statistical Shape and Texture Models," 2008, Diss. Technical University Munich, pp. 1-157.
Non-Final Office Action for U.S. Appl. No. 13/226,756 mailed Aug. 20, 2013, 28 pages.
O'Toole, A.J. et al., "Sex classification is better with three-dimensional head structure than with image intensity information," Perception, 1996, pp. 75-84, vol. 26, Issue 1.
Rodriguez et al., "Rotation Forest: A New Classifier Ensemble Method," IEEE Transactions on Pattern Analysis and Machine Intelligence, Oct. 2006, pp. 1619-1630, vol. 28, No. 10.
Shan, G.S. et al., "Fusing gait and face cues for human gender recognition," Neurocomputing, vol. 71, Issues 10-12, pp. 1931-1938 (2008).
Slomka, S. et al., "Automatic gender identification optimised for language independence," Proceedings of IEEE ETENCON '97. IEEE Region 10 Annual Conference. Speech and Image Technologies for Computing and Telecommunications., Dec. 1997, pp. 145-148, vol. 1.
Sun et al., Genetic Feature Subset Selection for Gender Classification: A Comparison Study, A comparison study, Proceedings of the Sixth IEEE Workshop on Applications of Computer Vision, 2002 (WACV 2002), pp. 1-6.
Vapnik, Vladimir N., "Chapter 11—The Support Vector Method for Estimating Real-Valued Functions," Statistical Learning Theory, 1998, pp. 443-492, John Wiley & Sons, Inc., New York.
Vapnik, Vladimir N., "Chapter 12—SV Machines for Pattern Recognition," Statistical Learning Theory, 1998, pp. 493-520, John Wiley & Sons, Inc., New York.
Wang et al., "Gender Classification from Infants to Seniors," 2010 Fourth IEEE International Conference on Biometrics: Theory Applications and Systems (BTAS), Sep. 27-29, 2010, 6 pages.
Wang, Z.H. et al., "Gender classification using selected independent-features based on genetic algorithm," 2009 International Conference on Machine Learning and Cybernetics, 2009, pp. 394-398, vol. 1.
Wild, H.A. et al., "Recognition and sex categorization of adults' and children's faces: examining performance in the absence of sexstereotyped cues," J. of Exp. Child Psychology, 2000, pp. 269-291, vol. 77, Issue 4.
Yang, M.H. et al., "Gender classification using support vector machines," Proceedings 2000 International Conference on Image Processing, 2000, vol. 2, pp. 471-474.
Yang, Z. et al., "Demographic classification with local binary patterns," Advances in Biometrics, Lecture Notes in Computer Science, 2007, vol. 4662, pp. 464-473, Springer Berlin/Heidelberg.

(56) References Cited

OTHER PUBLICATIONS

Yang, Z. et al., "An experimental study on automatic face gender classification," 18th International Conference on Pattern Recognition, ICPR 2006, 2006, vol. 3, pp. 1099-1102.

Yoo, H.D. and Nixon, M., "Gender classification in human gait using support vector machine," Advanced Concepts for Intelligent Vision Systems, 2005, vol. 3708, pp. 138-145.

Yu, S. et al., "A study on gait-based gender classification," IEEE Transactions on Image Processing, Aug. 2009, pp. 1905-1910, vol. 18, Issue 8.

Zhu, Z. et al., "Markov blanket-embedded genetic algorithm for gene selection," Pattern Recognition, 2007, pp. 3236-3248, vol. 40, Issue 11.

Zhu, Z. et al., "Wrapper-filter feature selection algorithm using a memetic framework," IEEE Transactions on Systems, Man, and Cybernetics, Part B, 2007, pp. 70-76, vol. 37, Issue 1.

Albert, A. Midori et al., "The MORPH Database: Investigating the Effects of Adult Craniofacial Aging on Automated Face-Recognition Technology", Journal of Forensic Science Communications, Research and Technology, Apr. 2008, 7 pages, vol. 10, No. 2.

Albert, A. Midori et al.,"A review of the literature on the aging adult skull and face: Implications for forensic science research and applications," Journal of Forensic Science International, Apr. 16, 2007, pp. 1-9, (http://www.sciencedirect.com/science/article/B6T6W-4NH6N87-4/2/32387a10f5d792b909910ac112f32a6c).

Bäck, Thomas, "Selective Pressure in Evolutionary Algorithms: A Characterization of Selection Mechanisms," Proceedings of the First IEEE Conference on Evolutionary Computation, 1994, IEEE World Congress on Computational Intelligence, 1994, pp. 57-62.

Burges, Christopher J.C., "A Tutorial on Support Vector Machines for Pattern Recognition," Data Mining and Knowledge Discovery 2, 1998, pp. 121-167.

Chen, Cuixian et al., "Face Age Estimation Using Model Selection", in the Proceedings of IEEE Computer Society Workshop on AMFG, in association with the 23th IEEE Conf. on Computer Vision and Pattern Recognition (CVPR 2010), San Francisco, Jun. 2010, pp. 93-99.

Cootes, T. F. et al., "Active Appearance Models," IEEE Transactions on Pattern Analysis and Machine Intelligence, Jun. 2001, pp. 681-685, vol. 23, No. 6.

Cootes, T. F. et al., "Active Shape Models—Their training and Application," Computer Vision Graphics and Image Understanding, 1995, pp. 38-59, vol. 61, No. 1.

Cootes, T. F. et al., "Active Appearance Models," Proc. European Conference on Computer Vision 1998, pp. 484-498, vol. 2.

Edwards et al., "Advances in Active Appearance Models," The Proceedings of the Seventh IEEE International Conference on Computer Vision, 1999, pp. 137-142, vol. 1.

Edwards, G. J. et al., "Interpreting Face Images using Active Appearance Models," 3rd IEEE International Conference on Automatic Face and Gesture Recognition, Apr. 14-16, 1998, pp. 300-305.

Edwards, G. J. et al., "Face Recognition Using Active Appearance Models," ECCV, 1998, pp. 581-595, vol. 2.

Geng, X. et al., "Automatic age estimation based on facial aging patterns," PAMI, 2007, pp. 2234-2240, vol. 29, No. 12.

Guo, Guodong et al., "Cross-Age Face Recognition on a Very Large Database: The Performance Versus Age Intervals and Improvement Using Soft Biometric Traits", in the Proceedings of IAPR 20th International Conference on Pattern Recognition (ICPR 2010), Istanbul Turkey, Aug. 2010, pp. 3392-3395.

Hayashi, J. et al., "Age and Gender Estimation from Facial Image Processing," 41st SICE Annual Conference, Aug. 2002, pp. 13-18, vol. 1.

Horng, W. B. et al., "Classification of Age Groups Based on Facial Features," Tamkang Journal of Science and Engineering, 2001, pp. 183-192, vol. 4, No. 3.

Kwon, Y.H. et al., Locating facial features for age classification, In proceedings of SPIE—the International Society for Optical Engineering, 1993, pp. 62-72, vol. 2055.

Kwon, Y.H. et al., "Age Classification from facial images," Computer Vision and Image Understanding, Apr. 1999, pp. 1-21, vol. 74.

Lanitis, A. "Comparative Evaluation of Automatic Age-Progression Methodologies," EURASIP Journal on Advances in Signal Processing, Jan. 2008, pp. 1-10, vol. 8, Issue 2.

Lanitis, A. et al., "Modeling the process of ageing in face images," ICCV, 1999, pp. 131-136, vol. 1.

Luu, Khoa et al. "Automatic Child-Face Age Progression Based on Heritability Factors of Familial Faces", The First IEEE International Conference on Biometrics, Identity and Security (BIDS), Tampa, Fl, Sep. 2009, pp. 1-6.

Luu, Khoa et al. "Age Estimation using Active Appearance Models and Support Vector Machine Regression", IEEE Third International Conference on Biometrics: Theory, Applications and Systems (BTAS), Washington DC, Sep. 2009, pp. 1-5.

Luu, Khoa et al., "Combined Local and Holistic Facial Features for Age-Determination", Proceedings of the 11th International Conference on Control, Automation, Robotics and Vision, Singapore, Dec. 7-10, 2010, p. 900-904.

Luu, K. et al. "Spectral Regression based Age Determination", IEEE Computer Society Workshop on Biometrics, in association with the 23th IEEE Conf. on Computer Vision and Pattern Recognition (CVPR 2010), San Francisco, Jun. 2010, pp. 103-107.

Patterson, Eric et al., "Improvements in Active Appearance Models Synthetic Age Progression for Adult Aging", Proceedings of the IEEE Conference on Biometrics: Theory, Applications, and Systems (BTAS), Washington, D.C., Sep. 28-30, 2009, pp. 1-5.

Patterson, Eric et al., "Aspects of Age Variation in Facial Morphology Affecting Biometrics," Proceedings of the IEEE Conference on Biometrics: Theory, Applications, and Systems, Washington, D.C., Sep. 2007, pp. 1-6.

Patterson, Eric et al., "Comparison of Synthetic Face Aging to Age Progression by Forensic Sketch Artist," Proceedings of the Seventh IASTED International Conference on Visualization, Imaging, and Image Processing, ACTA Press, Palma de Mallorca, Spain, Aug. 2007, pp. 247-252.

Patterson, Eric et al., "Automatic Representation of Adult Aging in Facial Images," Proc. 6th IASTED International Conference on Visualization, Imaging, and Image Processing, Palma de Mallorca, Spain, Aug. 2006, pp. 171-176.

Rawls, Allen et al., "MORPH: Development and Optimization of a Longitudinal Age Progression Face Database", BioID_MultiComm'09 Proceedings of the 2009 Joint COST 2101 and 2102 International Conference on Biometric ID Management and Multimodal Communication, Sep. 2009, pp. 17-24.

Rhodes, M. G., "Age Estimation of Faces: A Review," Applied Cognitive Psychology, 2008, pp. 1-12, vol. 23.

Ricanek, Karl et al., "Unconstrained Biometric Identification: Emerging Technologies", Computer Magazine, Feb. 2010, pp. 56-62, vol. 43 No. 3.

Ricanek, Karl et al., "Generalized MultiEthnic Face Age Estimation", in the Proceedings of the IEEE Conference on Biometrics: Theory, Applications, and Systems (BTAS), Washington, D.C., Sep. 2009, pp. 1-6.

Ricanek, K. et al., "A Novel Cognitive Psychology Based Face Recognition System for Improved Identification Rates for the Problem of Age-Progression," Proceedings of the Seventh IASTED International Conference on Visualization, Imaging, and Image Processing, ACTA Press, Palma de Mallorca, Spain, Aug. 2007, pp. 289-294.

Ricanek, K. et al., "MORPH: A Longitudinal Image Database of Normal Adult Age-Progression," IEEE 7th International Conference on Automatic Face and Gesture Recognition, Southampton, UK, Apr. 2006, pp. 341-345.

Ricanek, K. et al., "The Effect of Normal Adult Aging on Standard PCA Face Recognition Accuracy Rates," International Joint Conference on Neural Networks, Montreal, Canada, Jul. 2005, pp. 2018-2023.

Ricanek, Karl "Hierarchical Face Age-Estimation Algorithm Using Informed Facial Features", in the Proceedings of 19th Annual International ANNIE, St. Louis, MO, Nov. 2009, pp. 1-7.

(56) References Cited

OTHER PUBLICATIONS

Ricanek, K. et al., "Craniofacial Aging on the Eigenface Biometric," Proc. 6th International Association of Science and Technology for Development International Conference on Visualization, Imaging, and Image Processing, Palma de Mallorca, Spain, Aug. 2006, pp. 249-253.

Ricanek, K. et al., "Landmark Based Statistical Measures for Face Recognition," Hawaiian International Conference on Statistics, Honolulu, Hawaii, Jan. 2005 (Abstract).

Ricanek, K. et al., "Hopfield Like Networks for Pattern Recognition with Applications to Face Recognition," International Joint Conference on Neural Networks, Jul. 10-16 1999, pp. 3265-3269.

Sethuram, Amrutha et al., "A Hierarchical Approach to Facial Aging", in the Proceedings of IEEE Computer Society Workshop on AMFG, in association with the 23th IEEE Conf. on Computer Vision and Pattern Recognition (CVPR 2010), San Francisco, Jun. 2010, pp. 100-107.

Sethuram, A. et al., "Improvements and Performance Evaluation Concerning Synthetic Age Progression and Face Recognition Affected by Adult Aging", Proceedings of the Third IAPR International Conference on Biometrics (ICB), LNCS 5558, Jun. 2009, pp. 62-71.

Smola, A. et al., "A tutorial on support vector regression," Technical Report TR-1998-030, Neuro Colt Royal Holloway College, 1998, pp. 1-24.

Wang, Yishi et al., "Gender Classification from Infants to Seniors", Proceedings of the IEEE Conference on Biometrics: Theory, Applications, and Systems (BTAS), Washington, D.C., Sep. 27-29, 2010, p. 1-6.

Yan, S. et al., "Ranking with Uncertain Labels," ICME, 2007, pp. 96-99.

Yan, S. et al., "Extracting Age Information from Local Spatially Flexible Patches," ICASSP, 2008, pp. 737-740.

Yan, S. et al., "Regression from Patch-Kernel," ICPR, Jun. 23-28, 2008, pp. 1-8.

Zhu et al., "Towards a Memetic Feature Selection Paradigm," IEEE Computational Intelligence Magazine, 2010, pp. 41-53.

Zhuang, X. et al., "Face Age Estimation Using Patch-based Hidden Markov Model Supervectors," ICPR, Dec. 8-11, 2008, pp. 1-4.

\* cited by examiner

|  | Male | Female | Both |
|---|---|---|---|
| Young (0-18) | 389 (38.82%) | 298 (29.74%) | 687 (68.56%) |
| Adult (19-55) | 161 (16.07%) | 145 (14.47%) | 306 (30.54%) |
| Senior (56-69) | 5 (0.50%) | 4 (0.40%) | 9 (0.90%) |
| All Ages (0-69) | 555 (55.39%) | 447 (44.61%) | 1002 (100%) |
| Children (0-10) | 251 (25.05%) | 160 (15.97%) | 411 (41.02%) |

TABLE I

FIG. 12

| Gender recognition of different algorithms on Leave-one-person-out CV | | | | | |
|---|---|---|---|---|---|
| Range | PS | PR | LS | PA | LSA |
| All Ages(0-69) | 73.35% | 73.45% | 72.26% | 55.59% | 55.39% |
| Standard Error | 23.54% | 23.03% | 23.96% | 46.38% | 49.77% |
| #-Variable | 51 | 19 | 1 | 109 | 109 |
| Gender recognition of different algorithms on 5-fold CV | | | | | |
| Range | PS | PR | LS | PA | LSA |
| All Ages(0-69) | 84.33% | 82.73% | 83.03% | 63.77% | 55.39% |
| Standard Error | 1.16% | 1.49% | 2.92% | 4.57% | 3.16% |
| #-Variable | 56 | 53 | 14 | 109 | 109 |

TABLE II

FIG. 13

| Gender recognition of different algorithms on Leave-one-person-out CV | | | | | |
|---|---|---|---|---|---|
| Range | PS | PR | LS | PA | LSA |
| Young(0-18) | 67.10% | 66.67% | 65.21% | 55.60% | 56.62% |
| Adult(19-55) | 87.25% | 88.24% | 87.91% | 55.56% | 52.61% |
| Senior(56-69) | 77.78% | 88.89% | 77.78% | 55.56% | 55.56% |
| Children(0-10) | 63.99% | 63.26% | 61.56% | 59.12% | 61.07% |
| #-Variable | 51 | 19 | 1 | 109 | 109 |

| Gender recognition of different algorithms on 5-fold CV | | | | | |
|---|---|---|---|---|---|
| Range | PS | PR | LS | PA | LSA |
| Young(0-18) | 80.79% | 78.60% | 79.33% | 64.77% | 56.62% |
| Adult(19-55) | 92.16% | 91.83% | 91.50% | 61.76% | 52.61% |
| Senior(56-69) | 88.89% | 88.89% | 77.78% | 55.56% | 55.56% |
| Children(0-10) | 78.10% | 75.18% | 74.94% | 67.88% | 61.07% |
| #-Variable | 56 | 53 | 14 | 109 | 109 |

TABLE III

FIG. 14

UIUC-PAL: African-American, Asian, Caucasian, Hispanic, India.
FG-NET: Sample images of infant/toddler faces.
FIG. 22

| Gamma | Full Feature Model | MA result | No. of features |
|---|---|---|---|
| Default | 65.19 ± 0.46% | 87.59 ± 5.18% | 7 |
| 0.01 | 65.19 ± 0.46% | 65.74 ± 0.51% | 1 |
| 0.02 | 65.95 ± 0.91% | 65.19 ± 0.51% | 1 |
| 0.03 | 76.28 ± 2.26% | 67.59 ± 5.71% | 4 |
| 0.034 | 80.50 ± 2.15% | 80.56 ± 7.13% | 13 |
| 0.04 | 84.46 ± 2.38% | 84.62 ± 4.37% | 18 |
| 0.05 | 87.22 ± 2.66% | 85.74 ± 1.68% | 15 |
| 0.1 | 92.06 ± 2.89% | 87.59 ± 2.32% | 13 |
| 0.2 | 93.30 ± 2.66% | 88.89 ± 1.73% | 18 |
| 0.3 | 93.84 ± 2.45% | 88.89 ± 3.14% | 17 |
| 0.4 | 94.30 ± 2.30% | 89.63 ± 2.40% | 20 |
| 0.5 | 94.61 ± 2.13% | 90.37 ± 2.67% | 18 |
| 0.6 | 94.69 ± 2.08% | 90.93 ± 1.52% | 19 |

TABLE IV

FIG. 25

| Gamma | Full Feature Model | MA result | No. of features |
|---|---|---|---|
| Default | 86.19 ± 2.78% | 88.89 ± 2.93% | 19 |
| 0.01 | 92.02 ± 2.86% | 87.59 ± 4.17% | 15 |
| 0.02 | 93.57 ± 2.53% | 89.26 ± 2.75% | 17 |
| 0.03 | 94.09 ± 2.13% | 89.26 ± 2.32% | 18 |
| 0.034 | 94.39 ± 2.11% | 88.89 ± 2.70% | 16 |
| 0.04 | 94.56 ± 2.05% | 89.26 ± 2.32% | 18 |
| 0.05 | 94.70 ± 2.12% | 90.19 ± 1.40% | 18 |
| 0.1 | 94.76 ± 2.07% | 90.19 ± 1.40% | 22 |
| 0.2 | 94.74 ± 1.84% | 90.37 ± 1.40% | 21 |
| 0.3 | 95.00 ± 1.75% | 90.56 ± 3.30% | 24 |
| 0.4 | 95.31 ± 1.76% | 88.15 ± 4.41% | 23 |
| 0.5 | 95.33 ± 1.89% | 89.44 ± 2.32% | 21 |

TABLE V

FIG. 26

| (C, Gamma) | Full Feature Model | MA result | No. of features |
|---|---|---|---|
| (10, 0.075) | 80.71 ± 2.36% | 77.44 ± 3.43% | 36 |
| (1, Default) | 55.39 ± 0.41% | 79.36 ± 3.79% | 8 |

TABLE VI

FIG. 27

| Gender recognition rate on UIUC-PAL using 5-fold CV | | |
|---|---|---|
| Algorithms | Overall (18-93) Accuracy: % | #-Variable |
| Genetic Algorithm | 77.78 ± 5.08 | 17 |
| Memetic Algorithm-1 | 87.59 ± 5.18 | 7 |
| Memetic Algorithm-2 | 87.04 ± 3.14 | 7 |
| PCA+Random Forest | 91.30 ± 2.23 | 21 |

TABLE VII

FIG. 28

| Gender recognition rate on FG-NET using 5-fold CV | | |
|---|---|---|
| Algorithms | Overall(18-63) Accuracy: % | #-Variable |
| Genetic Algorithm | 67.07 ± 5.36 | 17 |
| Memetic Algorithm-1 | 70.36 ± 3.78 | 8 |
| Memetic Algorithm-2 | 69.86 ± 5.98 | 8 |
| PCA+Random Forest [28] | 82.73 ± 1.49 | 53 |

TABLE VIII

FIG. 30

| Model | (C, Gamma) | Training Accuracy | Testing Accuracy |
|---|---|---|---|
| Full Model | (10, 0.5) | 95.33% | 91.66% |
| Memetic | (1, 0.8) | 89.30% | 96.67% |
| Random Forest | (5, 0.6) | 93.87% | 95 % |

TABLE IX

FIG. 31

(a) Misclassification example for Full Model approach:
(b) Misclassification example for Memetic Algorithm approach:
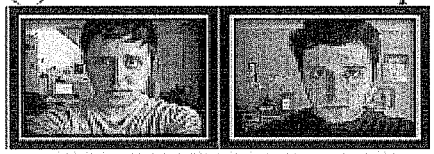
(c) Misclassification example for Random Forest approach:
FIG. 32

DEMOGRAPHIC ANALYSIS OF FACIAL LANDMARKS

CROSS-REFERENCE TO RELATED APPLICATION

This application is a continuation of U.S. patent application Ser. No. 13/627,687, filed Sep. 26, 2012, which is hereby incorporated by reference in its entirety, and to which this application claims priority. U.S. patent application Ser. No. 13/627,687 claims priority to U.S. provisional patent application No. 61/539,724, filed Sep. 27, 2011, which is also hereby incorporated by reference in its entirety herein.

BACKGROUND

In recent years, digital photography has become the preferred method of capturing still pictures. Due to the availability of low-cost, large-scale storage media, it has grown to the point that there are billions of digital photographs on the Internet. In addition to personal collections of digital photos, private, public and government entities may collect and store digital photographs for personal, commercial, security, and other purposes. Many of these digital photographs depict the faces of one or more persons.

OVERVIEW

It is desirable to be able to estimate demographic characteristics (e.g., age, race, gender, etc.) as well as facial attributes (e.g., face shape, nose type, lip size, etc.) of persons from facial images in the digital photographs. However, current proposals exhibit a lack of accuracy when determining race, gender, or age within several years.

Thus, in a first example embodiment, a set of training vectors may be identified. Each training vector may be mapped to either a male gender or a female gender, and each training vector may represent facial landmarks derived from a respective facial image. An input vector of facial landmarks may also be identified. The facial landmarks of the input vector may be derived from a particular facial image. A feature vector may containing a subset of the facial landmarks may be selected from the input vector. A weighted comparison may be performed between the feature vector and each of the training vectors. Based on a result of the weighted comparison, the particular facial image may be classified as either the male gender or the female gender.

Alternatively or additionally, in the first example embodiment, each training vector may be mapped to a specific race or ancestry group, and each training vector may represent facial landmarks derived from a respective facial image. Based on a result of the weighted comparison, the particular facial image may be classified as belonging to one or several race or ancestry group(s).

In a second example embodiment, a non-transitory computer-readable medium, may have stored thereon program instructions that, upon execution by a computing device, cause the computing device to perform operations in accordance with the first example embodiment.

In a third example embodiment, computing system may include at least one processor, data storage, and program instructions. The program instructions may be stored in the data storage, and, upon execution by the at least one processor, may cause the computing system to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 12 is a table illustrating a composition of males and females at different age groups in a FG-NET database, in accordance with an example embodiment;

FIG. 13 is a table illustrating an overall recognition of the FG-NET database, in accordance with an example embodiment;

FIG. 14 is a table illustrating gender recognition over different ranges on the FG-NET database, in accordance with an example embodiment;

FIG. 22 shows sample images selected from two different facial databases, in accordance with an example embodiment;

FIG. 25 is a table illustrating a gender classification accuracy using a Memetic algorithm on one database with a low computational accuracy, in accordance with an example embodiment;

FIG. 26 is a is a table illustrating a gender classification accuracy using a Memetic algorithm on one database with a high computational accuracy, in accordance with an example embodiment;

FIG. 27 is a table illustrating a gender classification accuracy using a Memetic algorithm on another database, in accordance with an example embodiment;

FIG. 28 is a table illustrating an overall gender classification on one database with different feature selection approaches, in accordance with an example embodiment;

FIG. 30 is a table illustrating an overall gender recognition on a FG-NET database, in accordance with an example embodiment;

FIG. 31 is a table illustrating a testing accuracy of different model approaches using Noak Kalina image samples, in accordance with an example embodiment;

FIG. 32 are misclassification examples for three different model approaches using Noah Kalina image dataset, in accordance with an example embodiment.

DESCRIPTION

I. Introduction

Figure 1:
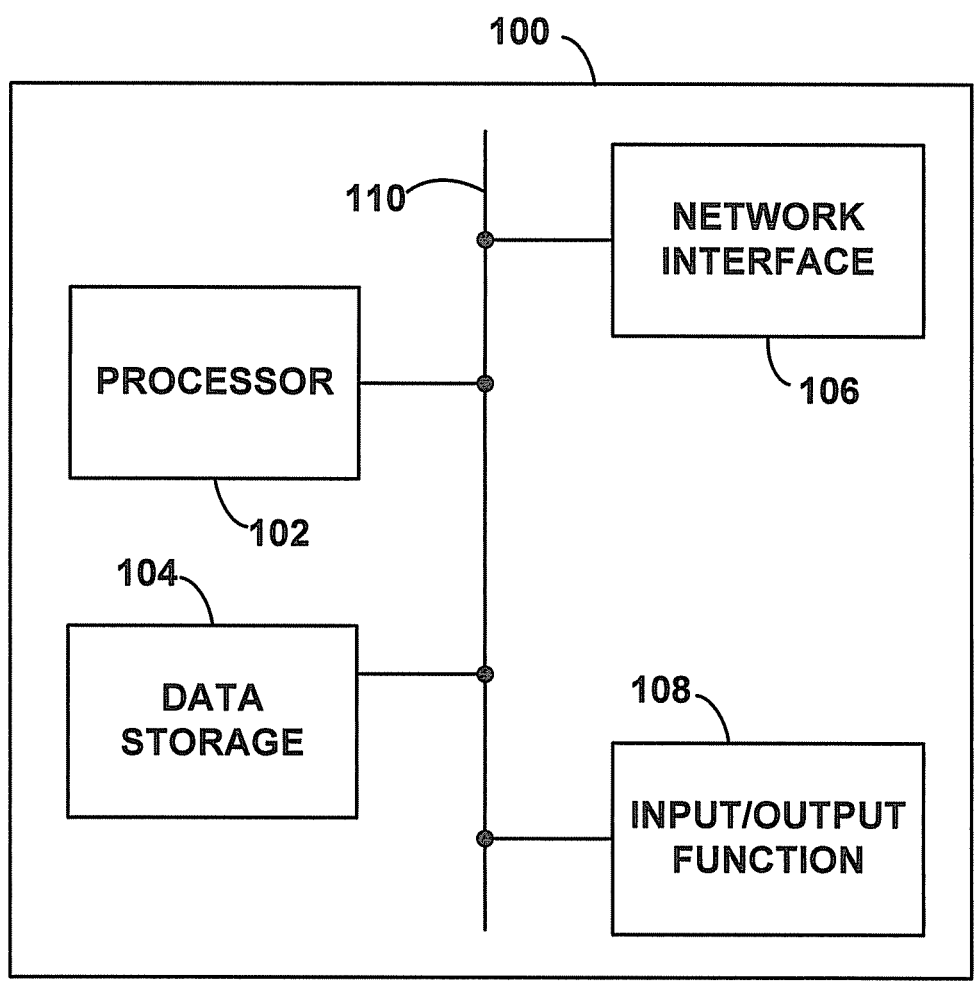
FIG. 1 is a block diagram of a computing device, in accordance with an example embodiment.

Human facial characteristics vary dramatically across ages, races, and genders. As just one example, the bio-dynamics of facial aging may be different for various ranges of age. In addition to idiosyncratic aging factors that affect the appearance of different individuals, facial aging may also be influenced by age-related biomechanical factors that affect all individuals. For instance, the facial aging of children is typically dominated by the lengthening and widening of cranial bone structure (e.g., bone expansion and/or or hard-tissue elongation), while the facial aging of adults is mostly driven by the wrinkling, creasing, and lining of skin, sagging of soft tissues, thinning of fat pads, and bone-remodeling of specific facial cranial structures.

In particular, young children typically have high foreheads, small noses, and small jaw bones. However, their eyes may appear large compared to the rest of their faces. The skin of children is typically smooth and firm. As children age, their foreheads become more sloped, their noses and jaws lengthen, and their eyes become proportionally smaller due to the lengthening and widening of other facial components.

While most growth stops at approximately 20 years of age, individuals' faces continue to change. In particular, nose and ear soft tissue often continues to grow. Also, the amount of fatty tissue supporting the face decreases, leading to drooping and/sagging of features. Skin also changes in texture and appearance. There may be a decrease in the amount of water in the skin, which leads to wrinkling, and hyper-pigmentation (e.g., age spots) may appear. Areas of the face changes due to bone resorption through remodeling as in the mandible region which changes for senior adults regardless of tooth loss, which was until recently believed to be the primary driver of mandible remodeling.

Wrinkling often begins during or before middle age, and increases with maturity. Thus, by the time individuals reach old age, their faces may be quite wrinkled. In addition, their hair may grey and become thin, their eyebrows may become thicker. Their hair may also become coarser before thinning in senescence. Hyper-pigmentation may continue, and they may lose teeth.

On the other hand, some facial features are comparatively static throughout an individual's life. For instance, the relative distance between the eyes is typically set at birth and does not change as a person ages.

Age is just one demographic characteristic that is indicated by facial features. Gender and race are two other demographic characteristics that may be determined through the analysis of these facial features. However, different subsets (though not necessarily disjoint subsets) of facial features may be best suited to estimate the age, gender, or race of a facial image. Therefore, in order to accurately estimate the demographic characteristics of a given facial image, it may be helpful to take age-specific, race-specific, and/or gender-specific facial characteristics into account. As a result, better models of facial images may be built, and more accurate age, race, and gender estimation may be performed.

The uses for these types of estimations are many-fold. For example, entities providing public security functions (e.g., local, state, and federal law enforcement agencies) may be given a general description of a person of interest (e.g., a white male between the ages of 25 and 35). These entities may have access to dozen, hundreds, or thousands of digital photographs, some of which may be suspected to contain pictures of this person's face. By making use of the embodiments herein, the number of photographs to consider may be reduced to a much smaller total by estimating the age, race, and/or gender of faces in these digital photographs.

However, this is not the only possible application for these embodiments. For instance, accurate age estimation is desirable in any situation where age verification is used to determine a qualification or legal status. To that point, casinos and bars may seek to verify that patrons are over the age at which they may legally consume alcohol, a youth sports organization may seek to verify that a participant's age is below a certain limit or within a certain range, and professional sports organizations may seek to verify that an athlete's age is above a certain limit or within a certain range.

In order to rapidly manipulate a potentially large number of digitally-represented facial images, one or more computing devices may be employed. FIG. 1 is a simplified block diagram exemplifying a computing device 100, illustrating some of the functional components that would likely be found in a computing device arranged to operate in accordance with the embodiments herein. Example computing device 100 could be a personal computer, wireless communication device, server device, mainframe device, and so on. Thus, the description of computing device 100 could apply to any combination of software and hardware used for the purposes described herein.

Example computing device 100 preferably includes a processor 102, data storage 104, a network interface 106, and an input/output function 108, all of which may be coupled by a system bus 110 or a similar mechanism. Processor 102 preferably includes one or more central processing units (CPUs), such as one or more general purpose processors and/or one or more dedicated processors (e.g., application specific integrated circuits (ASICs) or digital signal processors (DSPs), etc.).

Data storage 104, in turn, may comprise volatile and/or non-volatile data storage and can be integrated in whole or in part with processor 102. Data storage 104 preferably holds program instructions, executable by processor 102, and data that is manipulated by these instructions to carry out the various methods, processes, or functions described herein. Alternatively, these methods, processes, or functions can be defined by hardware, firmware, and/or any combination of hardware, firmware and software.

Accordingly, any of the methods processes, or functions disclosed in this specification or the accompanying drawings may be represented as program instructions on any appropriate computer-readable medium. Thus, embodiments of this invention encompass an article of manufacture, including a non-transitory computer-readable medium, having program instructions stored thereon that, in response to execution by a computing device, cause the computing device to perform operations comprising any of these methods, processes, or functions.

Network interface 106 may take the form of a wireline connection, such as an Ethernet, Token Ring, or T-carrier connection. Network interface 106 may also take the form of a wireless connection, such as IEEE 802.11 (Wifi), BLUETOOTH®, or a wide-area wireless connection. However, other forms of physical layer connections and other types of standard or proprietary communication protocols may be used over network interface 106. Furthermore, network interface 106 may comprise multiple physical interfaces.

Input/output function 108 may facilitate user interaction with example computing device 100. Thus, input/output function 108 may comprise multiple types of input devices, such as a keyboard, a mouse, a touch screen, and so on. Similarly, input/output function 108 may comprise multiple types of output devices, such as a monitor, printer, and/or one or more light emitting diodes (LEDs). Additionally or alternatively, example computing device 100 may support remote access from another device, via network interface 106 or via another interface (not shown), such an RS-232 or universal serial bus (USB) port.

II. Facial Landmark Representation

Figure 2:
FIG. 2 is a digital photograph of a face, along with a set of facial landmarks, in accordance with an example embodiment.

FIG. 2 is an example digital photograph 200 of a face that is annotated with a set of 252 facial landmarks. In general, such a facial image can be annotated with any number of facial landmarks. Accordingly, the number of facial landmarks used in the embodiments herein may be less than or greater than the 252 facial landmarks shown in FIG. 2.

Facial landmarks may be chosen based on their ability to estimate the age, race and/or gender, either alone or in combination with one another. Thus, by examining a relatively small number of facial landmarks (e.g., a few dozen or a few hundred out of thousands of potential facial landmarks), a reasonably accurate estimate of these demographics may be obtained. Further, the facial landmarks most useful for respective estimation of age, race, and/or gender may differ. Therefore, out of the 252 facial landmarks in FIG. 2, one set of 30 may be chosen for age estimation, another set of 30 may be chosen for race estimation, and yet another 30 may be chosen for gender estimation. (It should be understood that these numbers are provided for purposes of illustration, and that a different number of facial landmarks may be chosen to estimate each demographic.) One tool for choosing these facial landmarks is to use an active appearance model (AAM), which can be used to identify areas in facial images that account for significant amounts of anthropometric variation between different facial images.

Regardless, once a set of facial landmarks are chosen, they may be represented as a vector. Each such vector may contain a plurality of values (e.g., numeric values), each associated with a facial landmark of a given facial image. Thus, for instance, particular values might represent the shape of the facial landmark, the intensity and/or coloration of pixels at or near the facial landmark, the distance of the facial landmark from another point on the face, the characteristic response of a correlation filter applied to some local neighborhood associated with the facial landmark, or some other aspect of the given facial image. As a result of this form of representation, these vectors may be manipulated by a computing device, such as computing device 100, to produce an age, race, and/or gender estimation.

III. Demographic Estimation

The embodiments herein may encompass machine learning techniques to provide at least some aspects of demographic estimation. One way in which to estimate a demographic characteristic of a given facial image is to compare this facial image to a plurality of facial images each of which having known demographic value(s). The result of this comparison may be an estimate of one or more demographic characteristics of the given facial image.

In this specification, some example embodiments use the age demographic characteristic. It should be noted that the techniques herein can also be used to estimate race and gender, as well as other types of demographics. Thus, these methods, processes, and functions of these example embodiments are not limited to age estimation, and may be used, in whole or in part, for other purposes as well.

a. Developing a Classification Function

For age estimation, a plurality of facial images, for each of which the actual age of the face is known, may be gathered and used as training data. This training data may be the basis of a function that classifies new facial images into two or more categories.

Based on the demographic characteristic being estimated (hereinafter also referred to as the "application"), a subset of facial landmarks may be chosen. For each facial image, the values associated with these chosen facial landmarks, which may be derived from some characteristic response of a correlation filter, may be placed in a training vector. Thus, each of n training vectors may be represented by $x_i$, where i=1 . . . n. Preferably, $x_i$ is the training vector for the ith facial image, and $x_i$ contains m facial landmarks. Each training vector $x_i$ may also be associated with $age_i$, the actual age of the face represented in the facial image.

Further, each training vector $x_i$ may be mapped to an age range in which age, falls. For example, based on the observation that child and adult faces age differently, two age ranges may be established, one for the ages 0-20 and the other for the ages 21 and over. Then, each of these ranges may be associated with a unique value. For instance, the age range of 0-20 may be associated with a value of −1, while the age range of 21 and over may be associated with the value of 1. These values may be represented for each facial image by the variable $y_i$. Thus, a mapping $(x_i, y_i)$ may be established between each training vector and an age range indicator.

It should be understood that the number of age ranges, and the starting and ending points of each age range, may differ from the above example. Moreover, the values taken on by $y_i$ may be different than those presented above. For instance, the age ranges of 0-20, 21-55, and 55 and over could be used, and $y_i$ could accordingly take on one of three values for each facial image. Other age ranges could be used as well.

Regardless, once the values of the training vectors $x_i$ and the age range mappings $y_i$ are determined for each facial image in the training data, machine learning techniques may be used to model the commonalities between facial images that map to each age range. One way of doing so is to use an SVM-based representation of the training vectors. Continuing with the example of two age ranges, an SVM model may be used to select a subset of $n_s$ training vectors (hereinafter referred to as the "support vectors" and notated as $s_j$) such that the distance between support vectors $s_j$ in m-dimensional space is substantially maximized. Therefore, support vectors $s_i$ may comprise vectors that accentuate the difference between facial landmarks or facial landmark characteristics that map to the age range of 0-20 and facial landmarks that map to the age range 21 and over.

In a possible embodiment, the SVM model may involve finding support vectors $s_i$, as well as the coefficients $\alpha_i$ and b to fit the equation $$w \cdot x + b = 0$$

where x is the matrix of training vectors, · is the dot-product operation, and $$W = \sum_{i=1}^{N_s} \alpha_i y_i s_i.$$

In particular, it is desirable for the support vectors $s_i$ to be linearly separable. Points in a two-dimensional space are linearly separable if they can be separated by a line drawn between them. Thus, sets of points are linearly separable in m-dimensional space if they can be separated by a hyperplane of m−1 dimensions. If the points in training vectors $x_i$ are not linearly separable, they can be mapped, through use of mapping function $\Phi$, to a Euclidian space H such that these points are linearly separable. Accordingly, support vectors $s_i$, as well as the coefficients $\alpha_i$ and b, may be found to fit the equation $$\sum_{i=1}^{N_s} \alpha_i y_i K(s_i, x) + b = 0$$

where the kernel function $K(a,\beta) = \Phi(a) \cdot \Phi(\beta)$. Values $\alpha_i$ and b are preferably a substantially optimal solution of a quadratic programming problem $$\min_{w,b,\xi} \frac{1}{2}\|w\|^2 + C \sum_{i=1}^{N_s} \xi_i$$

where C>0 is a regularization parameter, $\xi_i \geq 0$, and $y_i(w \cdot x_i + b) \geq 1 - \xi_i$.

As a result, a classifier function $f(z)$ may be constructed to determine whether an input vector represents the face of a child (e.g., ages 0-20) or an adult (e.g., ages 21 and over). Accordingly, $$f(z) = \sum_{i=1}^{N_s} \alpha_i y_i K(s_i, z) + b$$

where z is the input vector and K is Gaussian kernel function $$K(a, \beta) = e^{-\frac{1}{2\sigma^2}\|a - \beta\|^2}.$$

The value of standard deviation $\sigma$ may on various values.

The output of function $f(z)$ is may be between −1, indicating a child's face, and 1, indicating an adult's face. However, a function such as function $f(z)$ may output different values based on the number of range ranges defined. For instance, $f(z)$ may output different types or ranges of values when more than two age ranges are defined, thereby mapping the input vector z to one of the age ranges. In another possible embodiment, $f(z)$ may map the input vector z to more than one age range.

Figure 3:
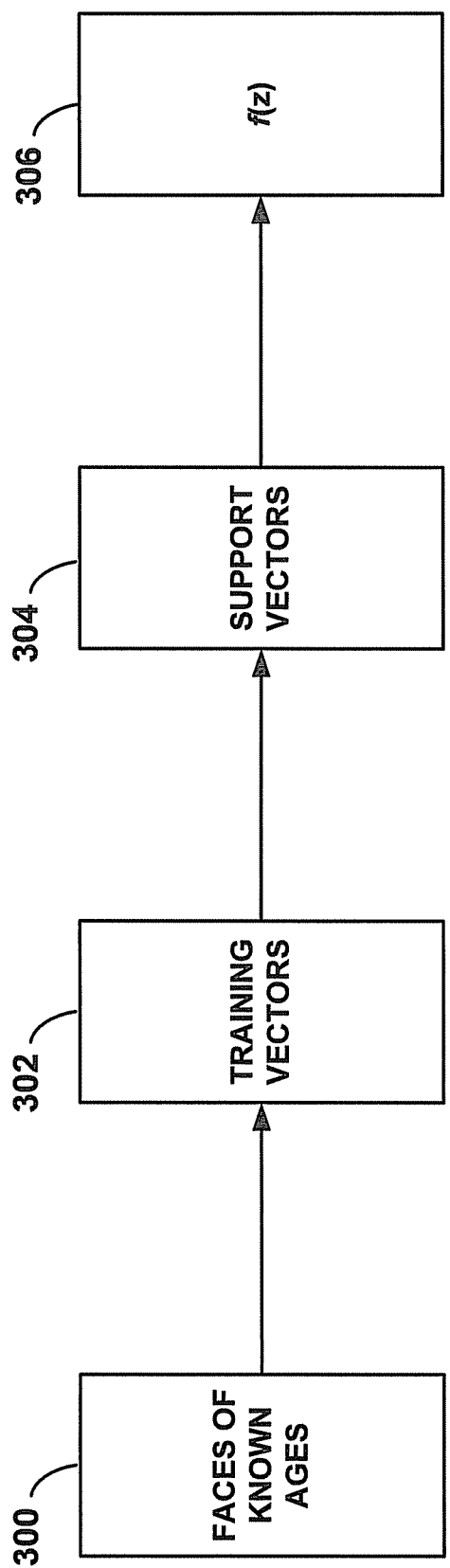
FIG. 3 is a workflow with which to construct an SVM, in accordance with an example embodiment.

FIG. 3 provides an example workflow of this classification process. Faces of known ages 300 may be processed to select facial landmarks, resulting in training vectors 302. Support vectors 304 may be selected from training vectors 302. An SVM may be developed from support vectors 304, resulting in a classification function $f(z)$. Given an input vector z based on a given facial image, $f(z)$ preferably produces a classification of the facial image into an age range.

It should be understood that the process depicted in FIG. 3 is presented for purposes of illustration. Thus, more or fewer components than are shown in FIG. 3 may be included, and these components may be arranged differently than is shown. Further, each component may be replaced with an equivalent or similar component without departing from the scope of the invention.

b. Fitting Classified Facial Images to Training Data

Once an input vector is classified, for example using a classification function as described above, the input vector may be compared to support vectors that represent faces with known ages within the classified age range. Thus, if the input vector is classified as representing the face of a child, the input vector may be compared to the support vectors representing faces with known ages from 0-20. But if the input vector is classified as representing the face of an adult, the input vector may be compared to the support vectors representing faces with known ages 21 and over. In a possible embodiment, this comparison may take the form of an SVR.

At a high level, the SVR technique is capable of building a hyperplane v that fits (e.g., is close to) the points in the training data. For the age estimation application, the training data is either the support vectors $s_1^c$ that represent children's faces, or the support vectors $s_1^a$ that represent adult faces. For a given subset of support vectors, $s_1^k$, v can be determined according to the equation $$|y_i - (v \cdot s_i^k + b)|_\varepsilon = \begin{cases} 0 & \text{if } |y_i - (v \cdot s_i^k + b)| < \varepsilon \\ |y_i - (v \cdot s_i^k + b)| - \varepsilon & \text{otherwise} \end{cases}$$

where the value of $\varepsilon$ can be varied, and may be an input parameter of the SVR calculation. In a possible embodiment $\varepsilon$ may take on a value of 0.05, but other values of $\varepsilon$ may be used instead.

The SVR may be determined by solving the quadratic programming problem characterized by the equations $$\min_{w,b,\xi,\xi^*} \frac{1}{2}\|v\|^2 + C \sum_{i=1}^{N_s} (\xi_i + \xi_i^*)$$
$$y_i - (v \cdot s_i^k + b) \leq \varepsilon + \xi_i$$
$$-y_i + (v \cdot s_i^k + b) \leq \varepsilon + \xi_i^*$$

preferably where C>0 is a regularization parameter, $\xi_i \geq 0$, and $\xi_i^* \geq 0$.

Using these quadratic programming equations, a function $f(s_i^k, z)$ can be developed to, based on the known ages of support vectors $s_i^k$, estimate the age of the facial image represented by input vector z. Therefore, a growth and development function $f(s_i^c, z)$ can be developed to estimate the age of facial images classified as children, and an aging function $f(s_i^a,z)$ can be developed to estimate the age of facial images classified as adult.

Figure 4:
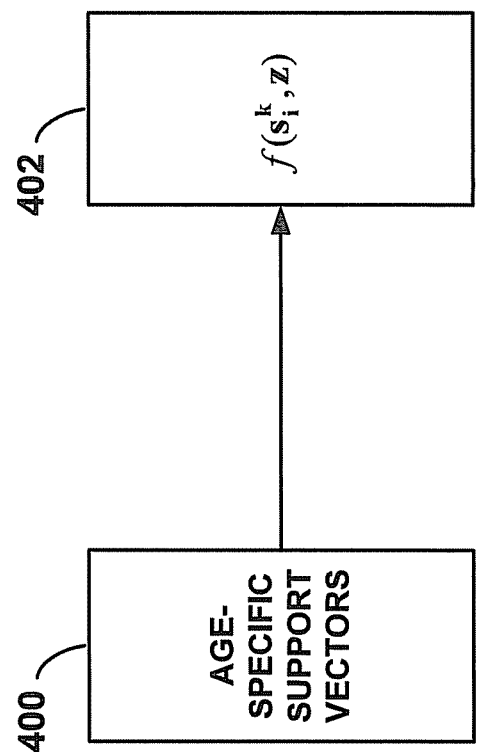
FIG. 4 is a workflow with which to construct an SVR function, in accordance with an example embodiment.

FIG. 4 provides an example workflow for how function $f(s_i^k,z)$ can be developed. Age-specific support vectors 400, e.g., either $s_i^c$ or $s_i^a$, are used to solve the quadratic programming problem. The result may comprise an age estimation function $f(s_i^k,z)$ 402.

Figure 5:
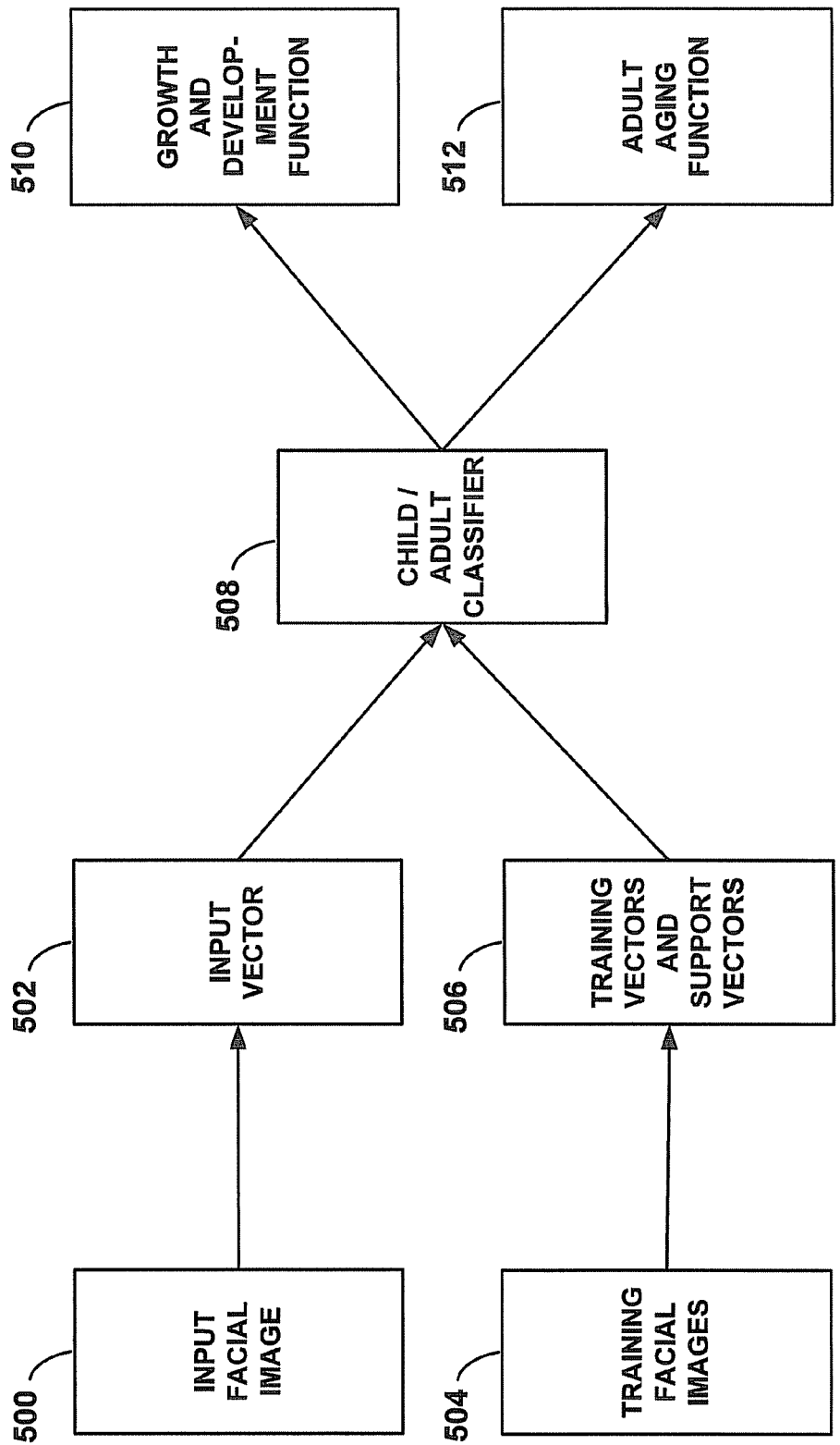
FIG. 5 is a workflow encompassing age classification and age estimation, in accordance with an example embodiment.

The combined workflow of developing a classification function and fitting classified facial images to training data is illustrated in FIG. 5. An input facial image 500 may be used to derive an input vector 502. Similarly, training facial images 504 may be used to derive training vectors and support vectors 506. Training vectors and support vectors 506 may be used, in turn, to develop child/adult classifier 508, which may be applied to input vector 502. Based on the output of child/adult classifier 508 applied to input vector 502, input vector 502 may then be used either with growth and development function 510 or adult aging function 512 to estimate the age of input facial image 500.

As in the case of FIG. 3, it should be understood that the workflows depicted in FIGS. 4 and 5 may presented for purposes of illustration. Thus, more or fewer components than are shown in FIGS. 4 and 5 may be included, and these components may be arranged differently than is shown. Further, each component may be replaced with an equivalent or similar component without departing from the scope of the invention. Moreover, there may be more than two age-specific support vectors defined, and accordingly, more than two age estimation functions.

c. Experimental Results

The accuracy of the demographic estimation techniques described herein can be evaluated in a number of ways. One such way of doing so is to use a mean absolute error (MAE) technique. MAE is the average absolute error between the actual demographic value and the estimated demographic value. Thus, for the case of age estimation, the MAE is the average absolute error between the actual age of a given facial image and the estimated age of the given facial image. More formally, MAE can be expressed as $$MAE = \frac{1}{n}\sum_{i=1}^{n} |age_i^{est} - age_i^{act}|$$

for a set of n facial images, where $age_i^{est}$ is the estimated age of the ith facial image and $age_i^{act}$ is the actual age of the ith facial image.

Additionally, the cumulative score technique may also be used to evaluate the accuracy of a demographic estimation technique. Cumulative score may be defined as $$CumScore(\theta) = \frac{n_{e<\theta}}{n} \times 100$$

where n is the total number of facial images and $n_{e<\theta}$ is the number of facial images for which the estimation error (the difference between the estimated age and actual age) was less than θ. Thus, the cumulative score produces a result between 0 and 100, where the closer the results are to 100, the lower the estimation error.

The embodiments herein were evaluated against two different databases of facial images for which the age of each facial image was known. A set of 802 facial images was used as training data. Once an SVM and an SVR were built based on facial landmarks extracted from these facial images, the ages of each of the 802 facial images were estimated. The result was an overall MAE of less than 2. The same SVM and SVR were also used to estimate the ages of 200 additional facial images, and the resulting MAE was less than 3.96 years. The latter result was lower than any other publicly-available result for the same database of facial images, which indicates that the embodiments herein may result in superior age estimation accuracy.

The embodiments herein have also produced the best known age estimation per decade of life, with results as indicated in the table below.

| Years | MAE Per Decade |
|---|---|
| 0-9 | 2.12 |
| 10-19 | 4.23 |
| 20-29 | 5.67 |
| 30-39 | 9.58 |
| 40-49 | 10.29 |
| 50-59 | 9.51 |
| 60-69 | 21.25 | d. Example Methods

Figure 6:
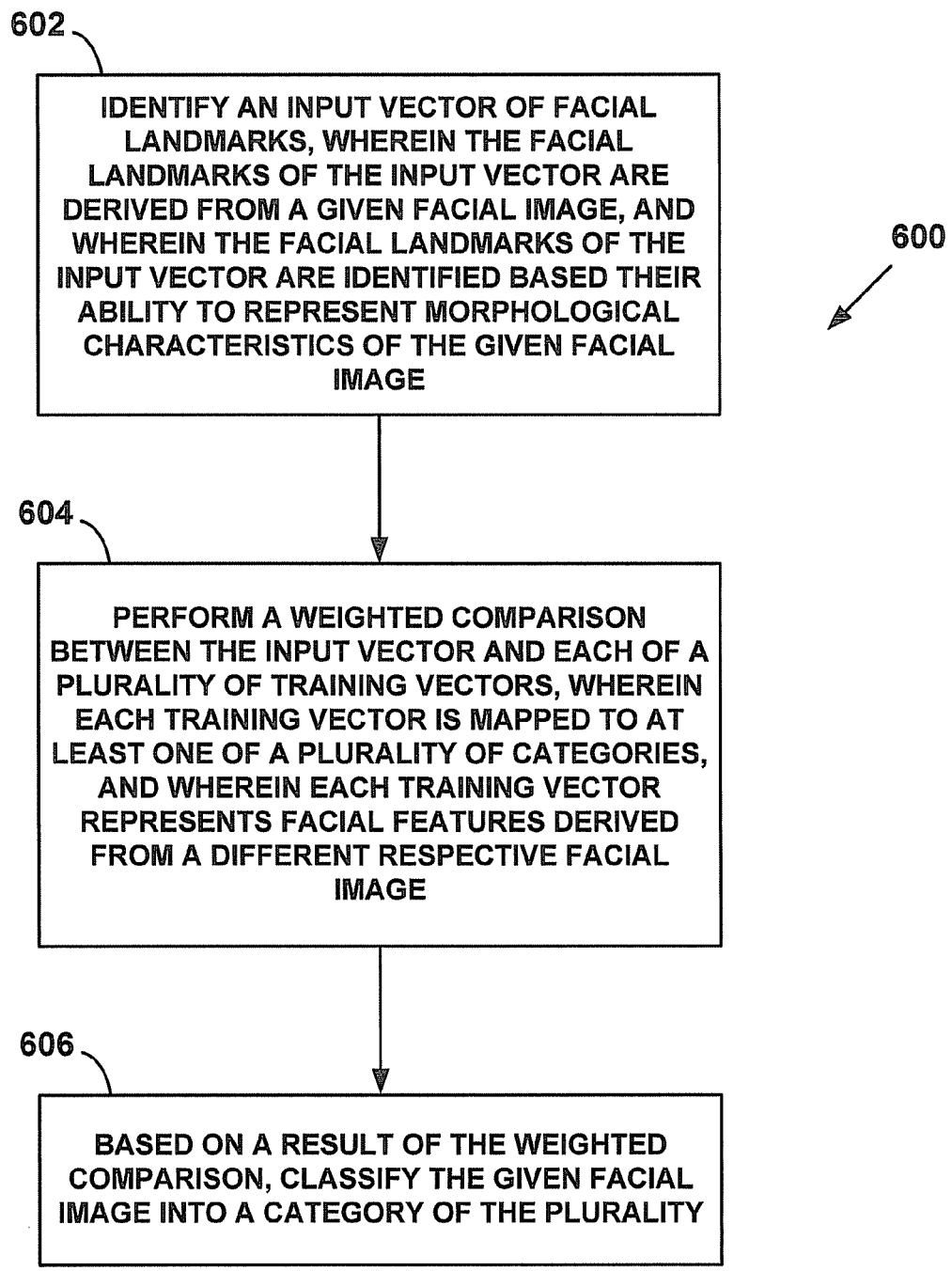
FIG. 6 is a flow chart, in accordance with an example embodiment.
Figure 7:
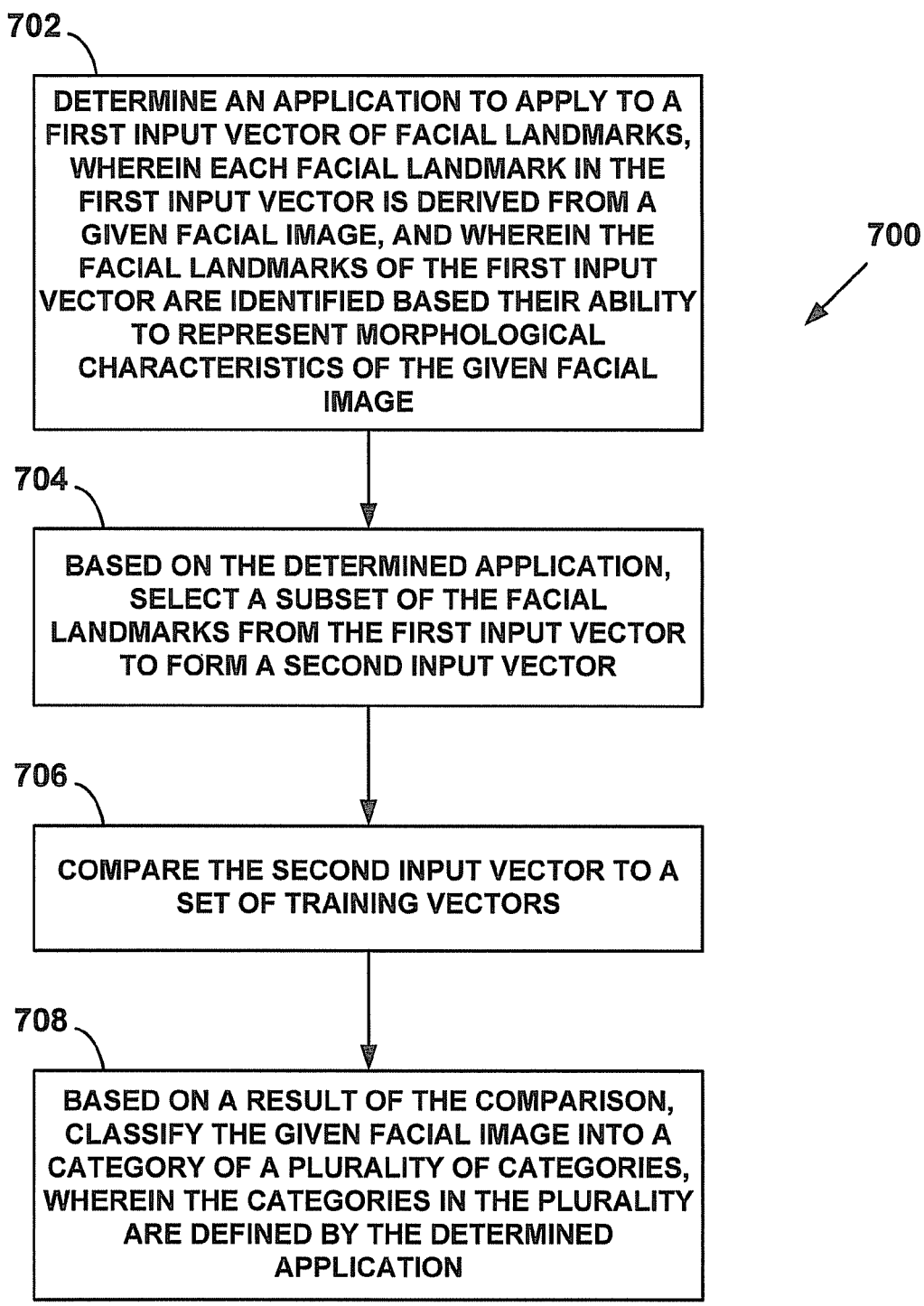
FIG. 7 is another flow chart, in accordance with an example embodiment.

FIGS. 6 and 7 provide flow charts 600 and 700, respectively, each in accordance with example embodiments described herein. However, these flow charts are presented for purposes of illustration. Thus, more or fewer steps than are shown in FIGS. 6 and 7 may take place, and these steps may occur in a different order. Additionally, the flow charts of FIGS. 6 and 7 may be combined, in part or in whole. Further, each step may be replaced with an equivalent or similar step without departing from the scope of the invention. Moreover, each of these flow charts may be performed, in whole or in part, by a computing device such as computing device 100.

According to a possible embodiment, at step 602 of method 600, an input vector of facial landmarks may be identified. The facial landmarks of the input vector may be derived from a given facial image. Preferably, these facial landmarks are identified based their ability to represent anthropometric characteristics of the given facial image. At step 604, a weighted comparison between the input vector and each of a plurality of training vectors may be performed. Each training vector may map to at least one of a plurality of categories, and each training vector may represent facial landmarks derived from a different respective facial image. At step 606, based on a result of the weighted comparison, the given facial image may be classified into a category of the plurality.

According to another possible embodiment, at step 702 of method 700, an application to apply to a first input vector of facial landmarks may be determined. Each facial landmark in the first input vector may be derived from a given facial image. The application may be, for example, an age estimation application, a gender estimation application, a race estimation application, or some other type of application that estimates demographic characteristics of the given facial image. The facial landmarks of the first input vector may be identified based their ability to represent anthropometric characteristics of the given facial image. At step 704, based on the determined application, a subset of the facial landmarks may be selected from the first input vector to form a second input vector. At step 706, the second input vector may be compared to a set of training vectors. At step 708, based on a result of the comparison, the given facial image may be classified into a category of a plurality of categories. Preferably, the categories in the plurality are defined by the determined application.

For either method 600 or 700, further additional features and/or steps may be applied. For instance, each training vector may also map to a region in m-dimensional space such that there is one region in the m-dimensional space defined for each category in the plurality. Then, performing the comparison between an input vector and the training vectors may comprise fitting the input vector to at least one of these regions. Additionally, classifying the given facial image into the category of the plurality may involve selecting the category of the plurality based on the at least one region in the m-dimensional space to which the input vector maps.

Also, each category in the plurality may be associated with a different human racial identity, a different gender, or a different age range, based on whether the embodiment is attempting to determine the race, gender, or age of the individual from whom the given facial image was derived. In these cases, at least some of the facial landmarks of the input vector may represent racial characteristics, gender characteristics, or age characteristics, respectively, of the given facial image.

If the embodiment is attempting to determine an age, then each training vector is preferably associated with an age of an individual from whom the different respective facial image was derived. Additionally, a second comparison of the input vector to a subset of the training vectors may be performed, where at least some of the subset of the training vectors map to the category of the plurality in which the given facial image was classified. Based on a result of the second comparison, an age of an individual from whom the given facial image was derived may be estimated. The second comparison may involve, for example, a regression-based fitting of the input vector to the at least some of the training vectors, and/or fitting the input vector to points in m-dimensional space that are defined by at least some of the training vectors.

Optionally, the plurality of categories may include a child age range. At least some of the subset of the training vectors that map to the child age range may represent facial features indicative of bone expansion or hard-tissue elongation. Further, the plurality of categories may include an adult age range. At least some of the subset of the training vectors that map to the adult age range may represent facial features indicative of wrinkling, hyper-pigmentation, or thinning of fat padding. Further discrete age ranges may be used in a similar fashion.

Besides face detection and face/body tracking, a comprehensive face recognition system can benefit from the inclusion of age estimation, gender classification, and/or ethnicity recognition. In the area of human-computer interaction, there are both commercial and security interests to develop a reliable system that has reliable vision capabilities for classifying a person's gender regardless of the person's age from a regular or low resolution image. Hereafter, additional techniques are introduced that enable the building of a reliable and automatic gender classification system, which has a better accuracy at differentiating genders of young faces that typically have less facial structure differences than the ones among adults. These additional techniques involve an extraction of effective low dimensional structure of the data while maintaining the facial features of interest. To demonstrate the accuracy of these techniques, their results will be compared to those obtained by selecting the best features to form an efficient model for gender classification. Furthermore, combining manifold learning with an AAM encoded face may produce high accuracy even with a majority of young faces in a face and gesture aging database, such as the FG-NET face database.

Hereafter, three model selection methods will be introduced and a comparison of the performances of these different models will be performed by using the features in sequential order or the features selected by the Random Forest technique. By applying a support vector machine (SVM), these techniques are evaluated for gender classification with the FG-NET image database.

IV. Techniques of Dimension Reduction and Variable Selection

There are many biological and behavioral differences between men and women, and social communication depends greatly on correct gender perceptions. A good gender classification system would greatly facilitate the interactions between human users and computers, and eventually make human computer interaction (HCI) more effective.

Similar to other pattern recognition problems, there are several aspects of gender classification, including feature extraction, feature selection, and classification. One way of performing feature extraction is to use intensity values of the facial image as the feature vector. However, the dimension of the vectors are usually high, and the extracted features can be highly correlated, and may be sensitive to scale, rotation, translation, and to image quality such as focus, blur, etc. In the area of classification and regression problems with high dimensional features, data overfitting can be an issue. This may be due to the number of training patterns being relatively small compared to the number of features, and thus any algorithm can establish a predictor that fits the training data well. However, on the testing data, the predictor may not work well, due to poor generalization. Subspace transformations, such as principal component analysis (PCA), independent component analysis (ICA), locality preserving projection (LPP), can be used for dimension reduction to project the original features into a low dimensional space.

However, none of the dimension reduction methods specify which projected features should be included by the classifier or regressor. Therefore, feature selection (FS) is a potential way to improve the prediction accuracy, by selecting significant features for pattern recognition function. Various feature selection schemes will be explored, which include (but are not limited to) PCA, LPP, Genetic Algorithms, Memetic Algorithms, and Random Forest. Then, the effectiveness of these feature selection methods may be compared for the gender classification problems on the longitudinal face database FG-NET and multi ethnicity based database UIUC-PAL.

Raw facial images may include various locations and pixel intensities. Dimension reduction methods may be used reduce the dependency among the covariates, while still maintaining important normalized features. Thus, given a set of vectors $\{x_1, x_2, \ldots, x_n\} \subset R_p$, a goal is to find a linear transformation matrix $A \in R_p \times 1$ that maps $x_i$ to $z_i = A^T x_i \in R_1$ ($1 \ll p$) such that $z_i$ "represents" $x_i$ for all $1 \le i \le n$.

a. Principle Component Analysis

PCA may be used convert a set of observations of possibly correlated variables into a set of linearly uncorrelated variables called principal components. The number of principal components may be less than or equal to the number of original variables. With the sample covariance matrix, PCA generates linear combinations of the vectors. The axes of the new coordinate system represent directions with maximum variabilities. However, PCA is focusing on the global structure among the features, possibly without specific attention to the response variable.

b. Locality Preserving Projections

The Locality Preserving Projections (LPP) can be summarized as following: with a given set of vectors $\{x_1, x_2, \ldots, x_n\}$, a graph $G=<V,E>$ may be constructed where the vertex set $V=\{v_1, v_2, \ldots, v_n\}$ with each vertex $v_i$ corresponding to the vector $x_i$. The edge set E can be defined by $(i, j) \in E$ if $x_j$ is among k nearest neighbors of $x_i$ or vice versa, or other similar fashions.

With G, a weighted adjacency matrix W may be constructed to preserve some response information. Two commonly used approaches to define such a W are the heat kernel and the simple-minded methods. The heat kernel defines $W_{ij}=\exp((-\|x_i-x_j\|^2)/2)$ for some $t \in R$ if $(i, j) \in E$; and $W_{ij}=0$ otherwise. The simple-minded method defines W as a standard adjacency matrix of G. (i.e. $W_{ij}=1$ if $(i, j) \in E$ and zero otherwise.)

Once W has been constructed, the objective is to minimize the following function:

$$\sum_{i,j}^{n} (\zeta_i - \zeta_j)^2 W_{ij}$$

under appropriate constraints, where $\zeta_i \in R$, $1 \leq i \leq n$ are the desired projections of $x_i$ on the real line. A solution of the minimization problem may be obtained by finding the eigenvector $a_1$ corresponding to the smallest eigenvalue of the generalized eigenvalue/eigenvector problem:

$$XLX^T a = \lambda XDX^T a$$

where D is a diagonal matrix with $D_{ii}=P_j W_{ji}$, $L=D-W$ is the Laplacian matrix, $X=[x_1, x_2, \ldots, x_n]$, and $\zeta_j = a_1^T x_i$.

Let $a_1, a_2, \ldots, a_l$ be the eigenvectors that corresponding to the first 1-smallest eigenvalues of (2) and let $A=[a_1, a_2, \ldots, a_l]$. If $$x_i \to z_i = A^T x_i,$$

then the $z_i$'s are the desired 1-dimensional vectors.

To define the graph G, $v_i$ and $v_j$ may be defined as adjacent if $x_i$ and $x_j$ belong to the same class (gender). For the weight $w_{ij}$, one can use both simple-minded method and heat kernel. In some studies, the simple-minded method shows superior results and, hence, is used for some of the results herein. However, the heat kernel may be used in its place.

c. Random Forest

The Random Forest (RF) approach is based on the idea of utilizing many noisy, unbiased, and equally weighted models by using the average output of those models. Each model of a RF is a binary tree. Let m be the number of variables for the selection and n be the number of observations, and there may be $N_t$ trees with minimum node size $n_{node}$ in the resulting forest. The detail of the RF algorithm may proceed as follows:

1) Generate a bootstrap sample of size n from the observations.
2) Grow a tree with the bootstrap sample by repeating the following steps:
   2.1) Select k variables at random from the m variables.
   2.2) Find the best variable among the k selected variables as well as its best split point for classification.
   2.3) Split the node into two descendent nodes with each node including a group of observations resulting from the classification.
   2.4) Stop the growth of the tree when the minimum node size $n_{node}$ is reached for all terminal nodes.
3) Repeat step 1 and step 2 $N_t$ times and get trees $\{T_i\}_{i=1}^{N_t}$.
4) For any input vector x, let $h_i(x)$ be the output from the ith tree. The prediction from the forest is $h_{rf}(x)=$mode of $\{h_i(x)\}_{i=1}^{N_t}$.

According to the Strong Law of Large Numbers, RF may not overfit the data, and when the trees are grown sufficiently deep, the bias may be low. Additionally, all trees may be independent and identically distributed, which greatly reduces variance caused by correlations.

Similar with other tree based methods, RF provides measurements of importance among the variables. One of these measures may be Gini importance. Considering a binary classification problem with $X_1, \ldots, X_p$ as the independent variables and Y as the response variable, where $Y \in \{0, 1\}$. At a given node $\tau$ of a given tree T, the Gini index is defined as $$G(\tau)=2p_\tau(1-p_\tau)$$

where $p_\tau=\Pr(Y=0|node=\tau)$. Suppose variable $X_j$ splits node $\tau$ to two sub-nodes $\tau_1$ and $\tau_r$, the decrease of Gini index at $\tau$ is defined as $$\Delta G(j, \tau, T) = G(\tau) - \frac{n_l}{n_\tau} G(\tau_1) - \frac{n_r}{n_\tau} G(\tau_r),$$

where $n_\tau$ is the number of sample subjects at node $\tau$, $n_1$ is the number of sample subjects at node $\tau_1$, and $n_r$ is the number of sample subjects at node $\tau_r$. The Gini importance of variable $X_j$ is $$I_G(j) = \sum_T \sum_\tau \Delta G(j, \tau, T).$$

Figure 8:
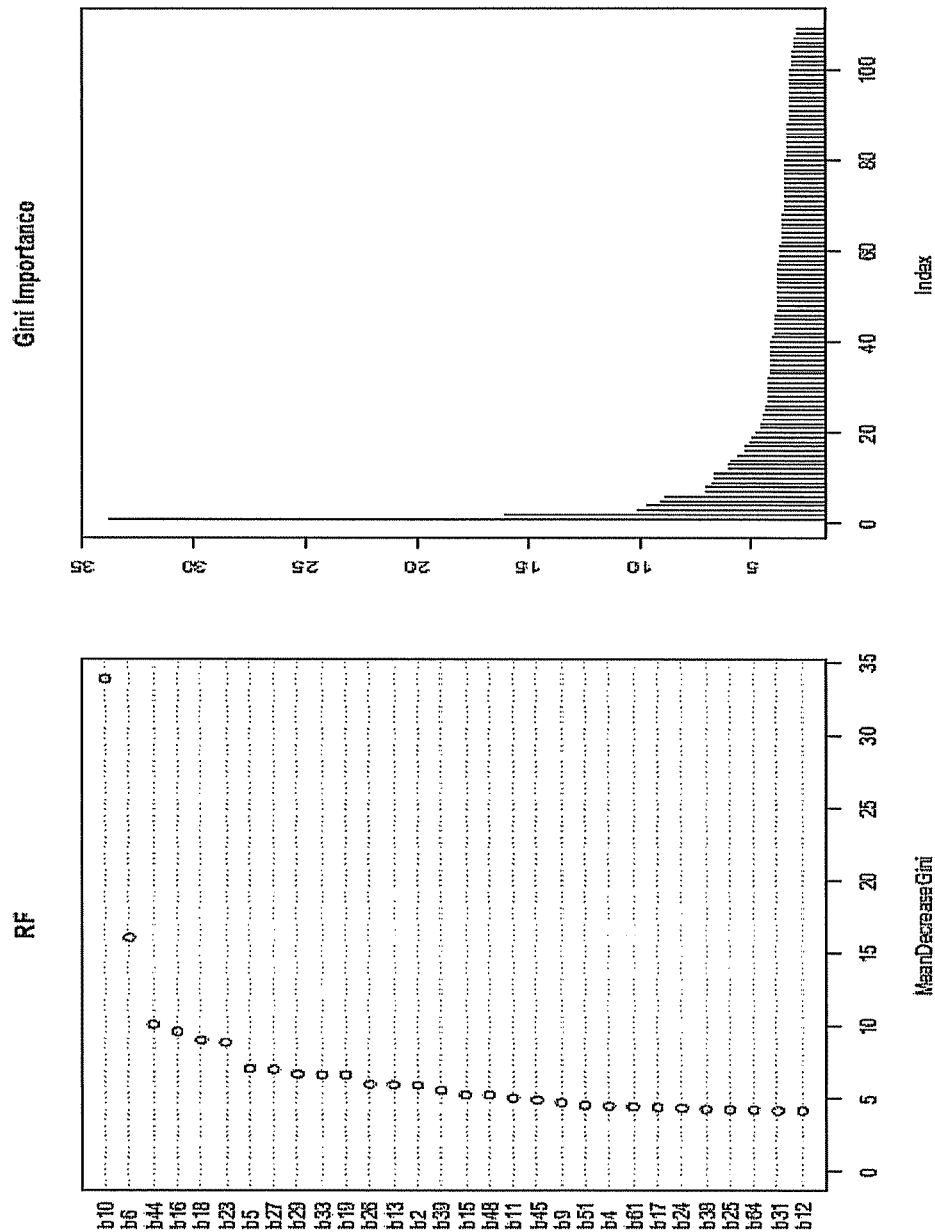
FIG. 8 includes graphs illustrating results of an application of a Random Forest approach, in accordance with an example embodiment.

FIG. 8 shows the variable importance plot as measured by RF on FG-NET database, based on 5-fold cross validation (CV). The left plot presents the dotchart of first 30 most important variables measured by the Gini importance index. The right plot gives the variable importance by Gini importance index of all variables, sorted in decreasing order.

d. Face Aging Database

Figure 11:
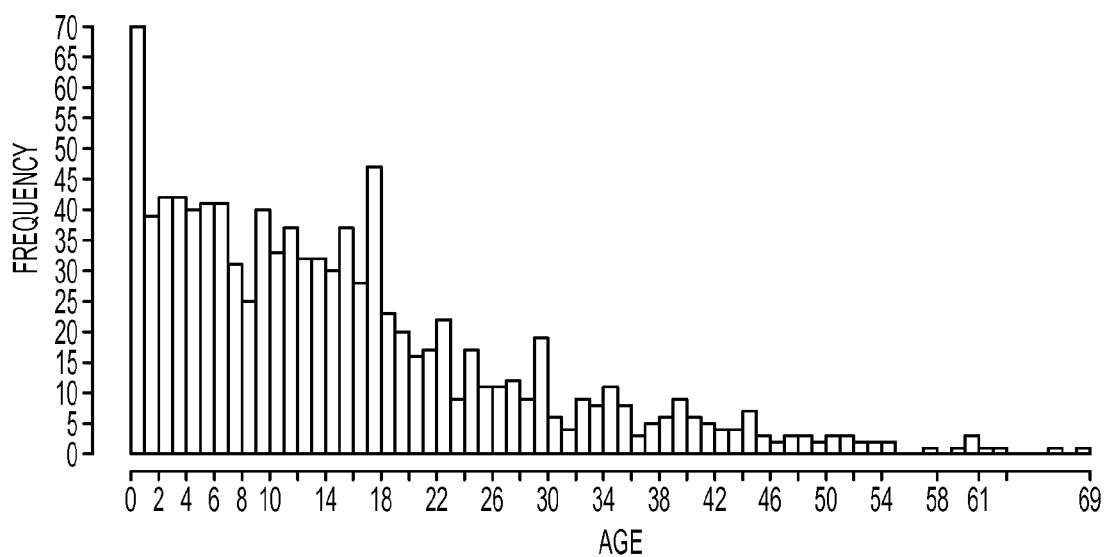
FIG. 11 is a histogram for FG-NET database images, in accordance with an example embodiment.

The FG-NET longitudinal face database is a public available image database. It contains 1002 color or grey scale face images from 82 subjects, with age ranging from 0 to 69 years. (See FIG. 9 for sample images.) A histogram for the age distribution of FG-NET databases is shown in FIG. 11. The histogram is right-skewed with its majority less than 30 years old, and only eight images aged more than 60.

The FG-NET is widely used in the areas of age estimation and age progression. However, it has not been used for gender classification, in part due to the fact that this database contains 70.86% of faces with ages 20 or below, which makes it a challenging data set for gender classification. Table I of FIG. 12 shows that 68.56% of all subjects are age 18 or below, and 41.02% of all subjects that are age 10 or below.

e. Experiment

The performance of three model selection approaches are evaluated under the general framework of gender classification. The first approach uses AAM (PCA) for dimension reduction and chooses features in sequential order, and it may be referred to as "PS" (PCA+sequential selection). The second approach uses AAM (PCA) for dimension reduction and Random Forest for variable selection with Gini importance. This approach may be referred to as "PR" (PCA+Random Forest). The third approach uses LPP as a second fold of dimension reduction, after obtaining features from AAM (PCA). Then it selects features in sequential order. This third approach may be referred to as "LS" (PCA+LPP+sequential selection). The results when all features are included in the first approach are also provided, as may be referred to as "PA" (PCA+all variable). Additionally, results with all features included in the third approach are presented, and it may be referred to as "LSA" (PCA+LPP+all variables). For these approaches, SVM may be used as the final gender classifier. The Leave-one-person-out (LOPO) cross validation and the 5-fold cross validation respectively may be used to evaluate the recognition rates for all proposed approaches.

f. Experimental Results

Figure 10:
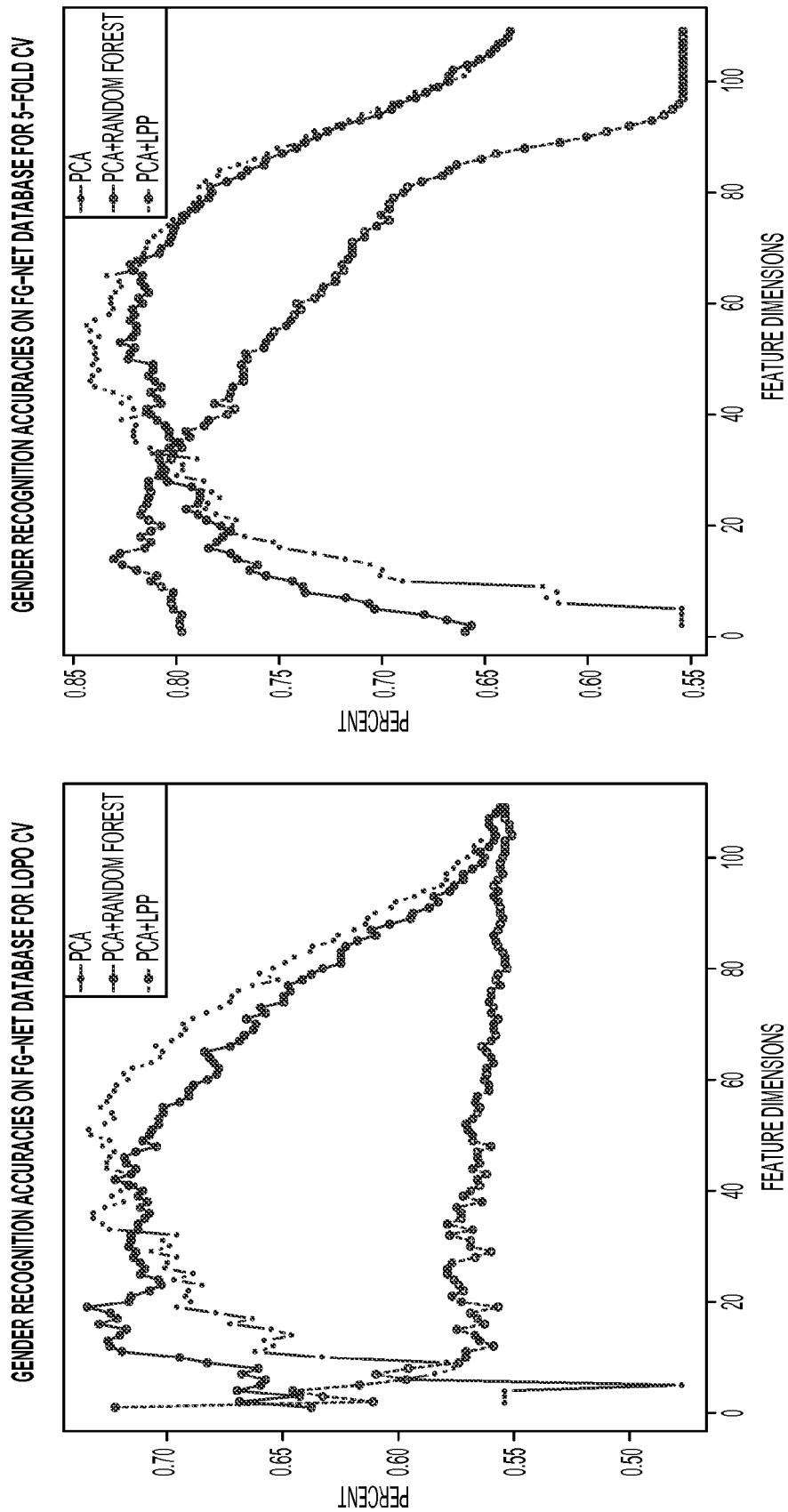
FIG. 10 include graphs illustrating gender recognition accuracies on a FG-NET database, in accordance with an example embodiment.

The experimental results are shown in Table II and Table III of FIGS. 13 and 14, respectively, and FIG. 10. Both tables contain two portions, with the top panel for LOPO cross validation and the bottom one for the 5-fold cross validation on the FG-NET database. Table II shows the overall recognition rates, standard errors and the number of selected features for both cross validation methods, while Table III shows the recognition rates over different age ranges.

From Table II, for the LOPO cross validation, the second approach, PR, achieves the best result with overall recognition rate 73.45% with selected subset of 19 features. As to the full feature model with all 109 features, for both PA and LSA, the overall recognition rates substantially decrease to below 56%. When comparing the first three approaches with the last two approaches, it suggests that including all features in a classification model would generate a large variance and hence the recognition rate deteriorates. Therefore, it may be desirable to choose an appropriate subset of features in order to improve the prediction power. In this example, the overall recognition rate increase from below 56% to above 72%, with 47% or less of all features.

Similar patterns follow in the second portion of Table II, for the 5-fold cross validation method. An exception is that the best recognition rate 84.33% is achieved by the PCA+sequential selection scheme with transformed features from the 56 largest eigenvectors. When comparing LS with both PS and PR, LS achieves similar recognition rates with much fewer features. Table III shows that there are differences in gender recognition rates between young and senior face images, and adult face images.

When LPP is compared to PCA, the advantage of LPP over PCA is obvious on the number of variables included in the adopted model building. This may be due to the fact that LPP aims to preserve the local structure, and the association matrix is designed to make the dimension reduction gender specific. For FG-NET, the race is more uniform and the majority of ages are between 0 and 30's, and thus preserving the local information may be desirable.

When comparing the LOPO with the 5-fold cross validation, it is clear that for the first three approaches, PCA (PS), PCA+Random Forest (PR), and PCA+LPP (LS), the 5-fold CV achieves much higher recognition rates than LOPO CV does. Also, from TABLE II, the standard errors from LOPO CV are much greater than the ones from 5-fold CV. Theoretically, 5-fold CV over-estimates the expected prediction error, and therefore under-estimates the expected prediction accuracy for a completely independent test sample.

For both cross validation schemes, models with selected variables show higher recognition rates than the ones from the full models. This demonstrates the usefulness of model selection in increasing the prediction accuracy. FIG. 10 presents similar patterns found from Table III. The figure suggests how the model improves at the beginning as it getting more and more useful features included. However, when there are "enough" features in the model, extra features tend to make the model overfit the training set and hence the power of generalization decreases. The shapes of the curves reflect the changes of the prediction powers with the number of features included in the models.

g. Human Perception

As aforementioned, the FG-NET database contains a majority of young faces, for which the recognition rate can suffer greatly. Table III shows that the recognition rate of young group is dominated by the one of the adult group, with difference at least 8% for both cross-validation methods.

A comparison may be made between these approaches and human perception of gender. In order to evaluate the performance of proposed approaches on young faces, especially on the infant and toddler, human subjects were asked to participate in a perceptual experiment.

Figure 9:
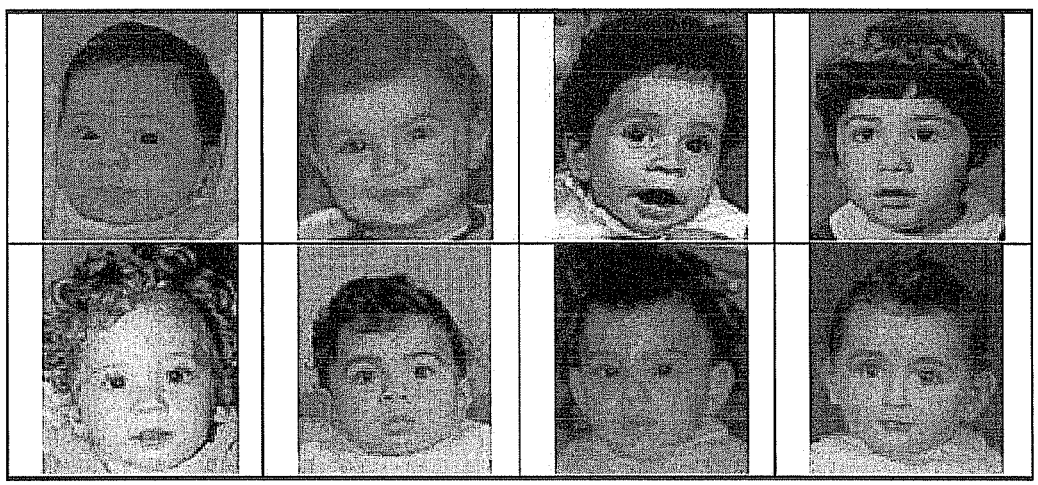
FIG. 9 depicts sample images of young faces, in accordance with an example embodiment.
Figure 15:
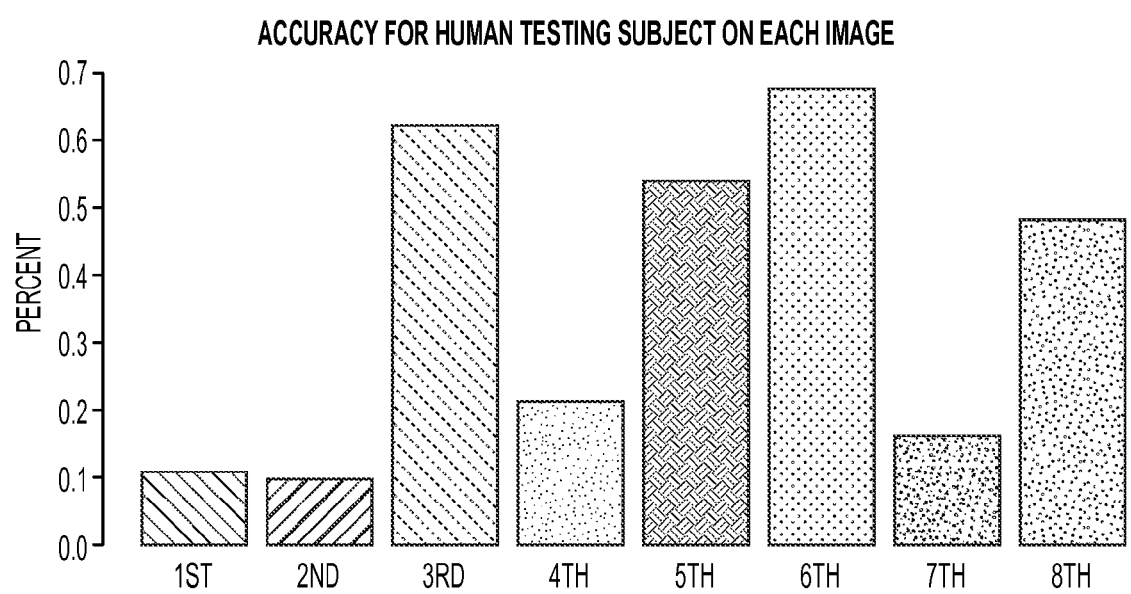
FIG. 15 is a bar graph illustrating human recognition performance on each sample image of FIG. 9, in accordance with an example embodiment.

First, a set of 8 infant and toddler images were selected from the FG-NET database (see FIG. 9). A total 278 subjects (126 males and 152 females), ranging from 12 to 75 years old, of five races (159 "White", 110 "Asian", 4 "Africa-American", 2 "Hispanic" and 3 "Mixed"), were asked to classify the gender of those 8 pre-selected images (the true genders are: M-F-F-M from left to right on the top, and M-M-F-M from left to right on the bottom). The percentage histogram of correct classification for these eight images is presented in the FIG. 15. It shows that the first, second and seventh images have the lowest recognition rates from human observers: 10.79%, 9.71%, 16.19%, respectively, while only the third, fifth and six images' recognition rates are over 50%.

Figure 16:
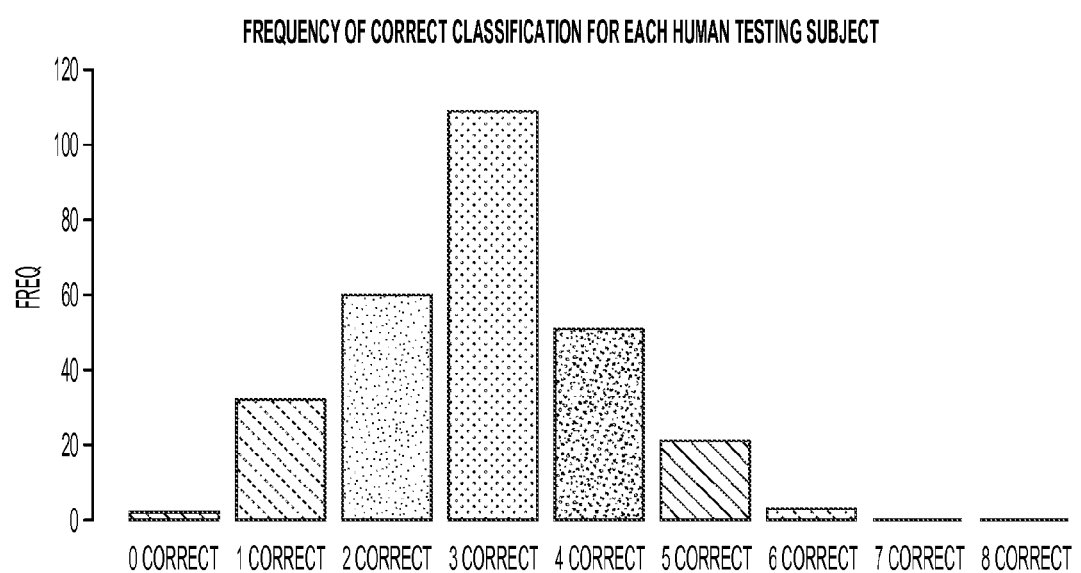
FIG. 16 is a bar graph illustrating a summary of human recognition performance on the eight sample images of FIG. 9, in accordance with an example embodiment.
Figure 17:
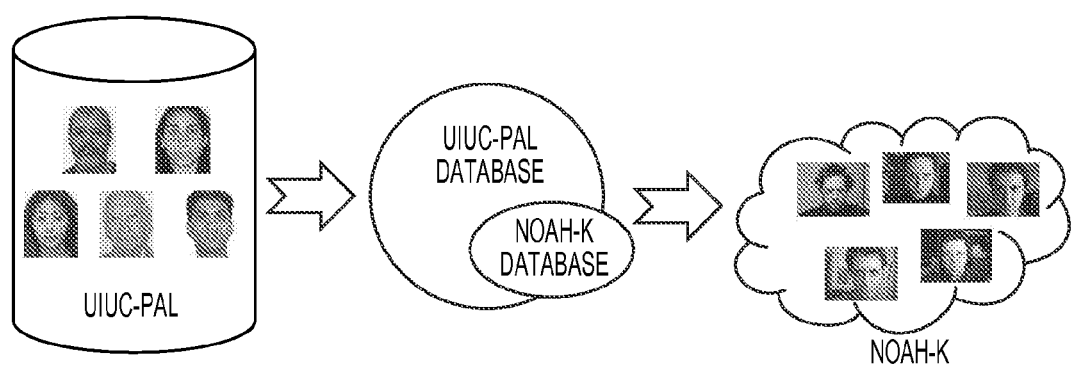
FIG. 17 illustrates a framework of cross domain testing for gender classification, in accordance with an example embodiment.

The overall performance of each individual observer may be considered. FIG. 16 shows the frequency of the total number of correct classifications from human observers. The graph shows that no human observer correctly identified all faces. There are 1.08% of human subjects who correctly classified 6 out of 8 images, with 7.55% of human subjects classifying 5 out of 8 images correctly. Moreover, 91.37% of human subjects achieve recognition rates that are equal or worse than flipping a coin. In sharp contrast, the proposed LS approach correctly classified 5 out of 8 toddlers by using LOPO CV. This indicated that the LS approach may find some unnoticed or unnoticeable cues that distinguish the gender among young children.

h. Memetic Algorithms for Features Selection

Figure 18:
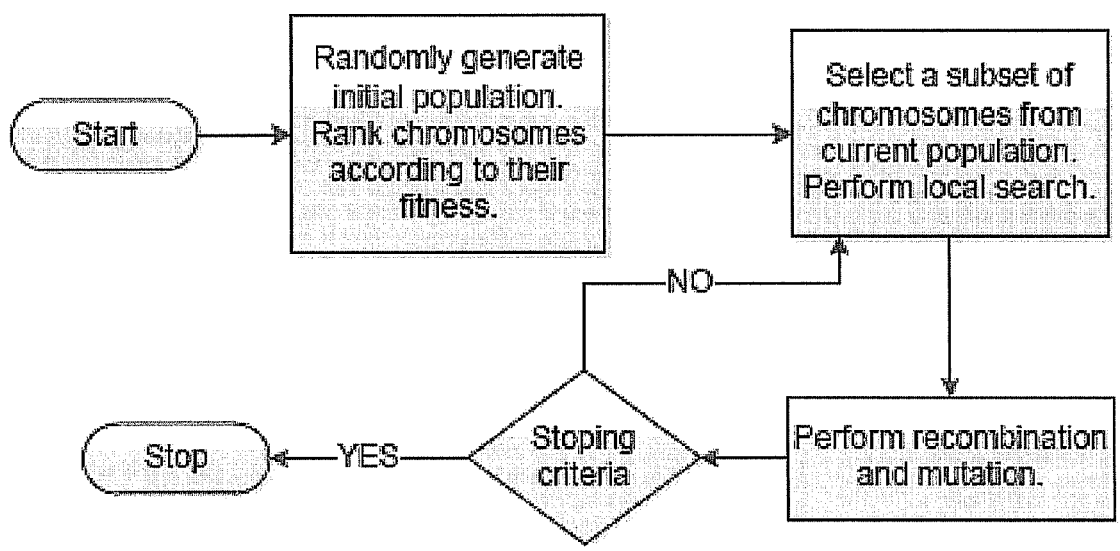
FIG. 18 is a flow chart for a Memetic algorithm, in accordance with an example embodiment.

A Memetic Algorithm (MA), also called hybrid genetic algorithm, is a genetic algorithm (GA) in which new chromosomes (encoded solutions) obtained via recombination and mutation may be improved using a local search. This section gives the description of the algorithm first, and then outlines some of the components for MA. FIG. 18 shows the flowchart of MA for feature selection.

Let D be the data sets of individuals and A be the attribute set for each individual in D (i.e. each individual in D can be represented by a vector of length |A|). Then, the feature selection for gender classification can be formulated as the following combinatorial optimization problem:

$$\max\{f(x)\}, x \in P(A)$$

where f(x) is the classification accuracy of D using the given features of x, and P(A) is the power set of A.

There may be three components for any MA: 1) determine the fitness of any given chromosome; 2) the recombination; and 3) the local search. For convenience, it is assumed the attribute set $A=\{1, 2, \ldots, n\}$ and each chromosome represented by a binary vector $x=(x_1, x_2, \ldots, x_n)$ with $x_i=1$ if the ith feature is selected and $x_i=0$ otherwise.

To determine the fitness for any given chromosome x, the classification accuracy may be used with the given features from x. The accuracy rate is computed as a function of the SVM for final classification. For the computational accuracy, if two chromosomes, x and y, have the similar fitness (i.e. the difference between their accuracy is less than a predefined tolerance ϵ), the one with smaller number of selected features is given higher chance to survive in the process. Feature selection may limit the number of features used, hence the features in the new chromosome produced during recombination process should not exceed its parents. This cannot be guaranteed by the commonly used crossover and mutation procedures, hence, restrictive crossover and restrictive mutation procedures may be used.

Figure 19:
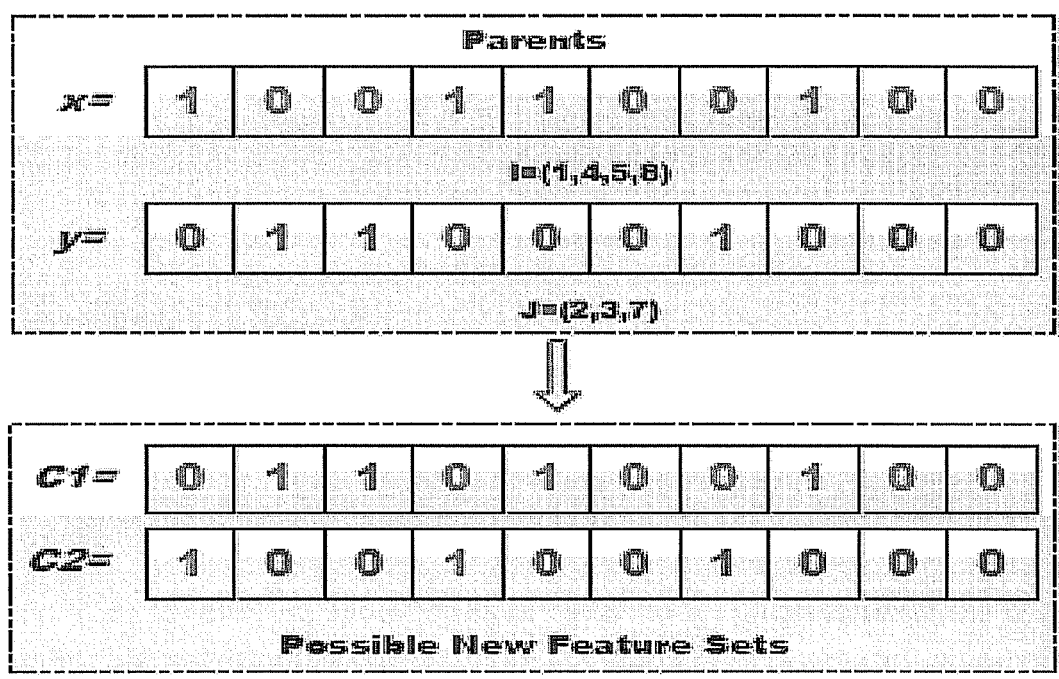
FIG. 19 illustrates an example of a chromosome restrictive crossover, in accordance with an example embodiment.

Let x and y be a given pair of chromosomes. The restrictive crossover may proceed as follows. Let $I=(i_1, i_2, \ldots, i_{k1})$ be those indices with $x_i=1$ and $J=(j_1, j_2, \ldots, j_{k2})$ be those indices with $y_j=1$. Now give $x_{i1}$ and $y_{j1}$ a crossover probability $p_c$, for $1 \leq l \leq k = \min\{k_1, k_2\}$ (i.e. $x_{i1}$ and $y_{j1}$ will switch their positions with a probability $p_c$). FIG. 19 demonstrates an example of restrictive crossover.

Figure 20:
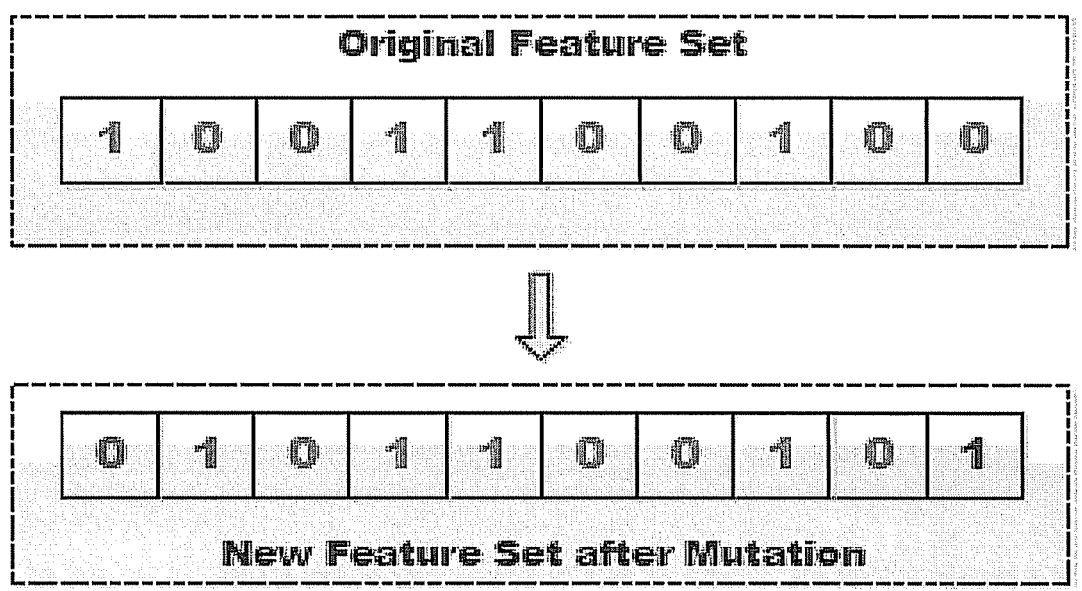
FIG. 20 illustrates an example of a chromosome restrictive mutation, in accordance with an example embodiment.

Based on the same or a similar principle, the restrictive mutation may include the following. Given a chromosome x, swap $x_{i1}$ with a randomly selected $x_j=0$ with a mutation probability $p_m$ for $1 \leq l \leq k_1$; then for each $x_j=0$, there is a $p_m$ probability of changing from 0 to 1. FIG. 20 demonstrates the restrictive mutation process.

Figure 21:
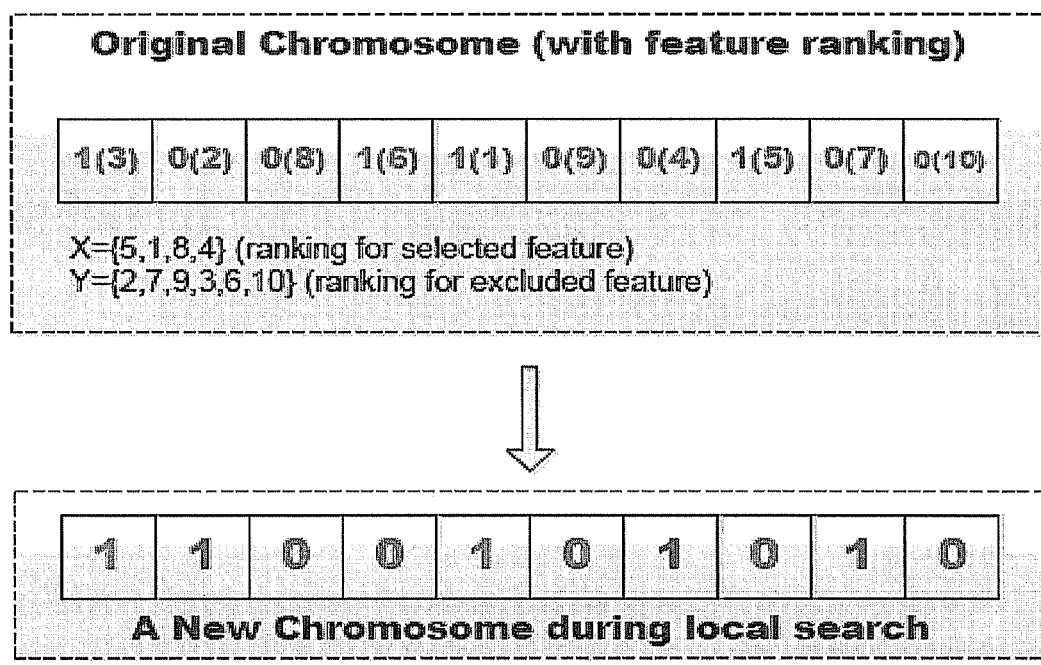
FIG. 21 illustrates an example of an identification of a new chromosome, in accordance with an example embodiment.

For the local search, both the improvement first strategy and greedy strategy may be used. Let x be a given chromosome, let X and Y be the sets of selected and excluded features in x respectively. Rank the features in X and Y using a univariate filter ranking method and with the most important feature ranked the highest. A new chromosome x' is produced by adding m top features in Y into X and removing n lowest ranked features from X, where m and n are randomly selected and less than s, a predefined search length. If the fitness of x' is better than x or equal to x with fewer features, replace x with x' in the population pool. FIG. 21 shows how a new chromosome is produced.

For improvement first strategy, the local search may be stopped once an improved x' is found. For greedy strategy, the local search has to go through all the possible combinations of m and n. There are $s^2$ possible combinations.

i. Experiment

In this section, the effectiveness of applying different feature selection approaches is evaluated systematically among Genetic Algorithm, Memetic Algorithms, sequential selection and Random Forest, and compared to the above discussed results.

The UIUC Productivity Aging Laboratory (UIUC-PAL) face database was selected for this experiment due to its quality of images and diversity of ancestry. The frontal images with neutral facial expression are selected for our age estimation algorithm. It contains 540 images with ages ranging from 18 to 93 years old. The UIUC-PAL contains adult face images of African-American, Asian, Caucasian, Hispanic and Indian. The FG-NET face image database was also used. FIG. 22 shows examples of images from UIUC-PAL database and infant/toddler images from FG-NET database.

Figure 23:
FIG. 23 shows a chronological sample of images taken over a span of ten years, in accordance with an example embodiment.

To study the real world application, the Noah Kalina dataset, denoted by Noah-K, is selected to evaluate the cross domain prediction error and to investigate the generalization ability of the proposed gender classification approaches. Noah Kalina has been taking a picture of himself daily for more than 10 years under uncontrolled lightings, which provides the real world scenarios of facial images. 60 images were selected as the testing set, with 6 images per year for 10 years. These images are selected in the same month (January, March, May, July, September, and November) per year with dates as close as possible, while compromising to the contrast of image lightings. FIG. 23 shows the sample images of one image per year within 10 years.

j. Experiment Setup

First, AAM may be applied on the face images for feature extraction, using a landmarking scheme, where AAM is a multi-factored PCA. The performance of four feature selection approaches may be evaluated among Genetic Algorithms, two schemes of Memetic Algorithms, and Random Forest. The first approach may use the regular Genetic Algorithm (i.e. no local search procedure) and it may be referred to as "GA." The second approach uses Memetic Algorithm with improvement first local search strategy, and may be referred to as "MA-1." The third approach uses Memetic Algorithm with greedy search, and may be referred to as "MA-2." The fourth approach is to use Random Forest for feature selection with Gini importance, which may be referred to as "PCA+Random Forest."

For all approaches, the non-linear support vector machine with a Gaussian kernel may be used, due to empirical superior performance in gender classification. The 5-fold cross validation to evaluate the recognition rates may be used for all proposed approaches.

k. Experiment Results

The Memetic algorithm was tested on the UIUC-PAL data set. Tables IV and V of FIGS. 25 and 26 provide the results with different tuning parameters, Cost C and gamma. In Table IV, C=1, and in Table V, C=10. By default, the value of gamma is equal to 1/{max index of variables}. The value 0.034 is included in the testing because it gave the best result from the sequential variable selection experiment discussed above.

The number of features selected from each GA/MA result may be the average of the number of selected features among 5-fold CV. Both tables show when gamma sets to default it gives the best improvement. The results also show that if a set of "good estimated" parameters are provided in advance, the MA results may not be better than the full feature model, and the number of features selected is much higher in the case when the cost C is set to 1.

Due to the number of instances in FG-NET and computational intensity, only two particular results are provided in Table VI of FIG. 27. When the cost C equals to 1 and gamma is set as default, it gives the best improvement and the least number of average features selected. When cost C equals to 10 and gamma equals to 0.075, the full model has the highest accuracy and MA result shows the same behavior as the results from UIUC-PAL experiments.

Based on the above experiments, it suggests that the SVM should not be tuned in advance when using MA approach for feature selection. Without setting these tuning parameters in advance, it gives a reasonable training result with a much smaller feature set.

Figure 24:
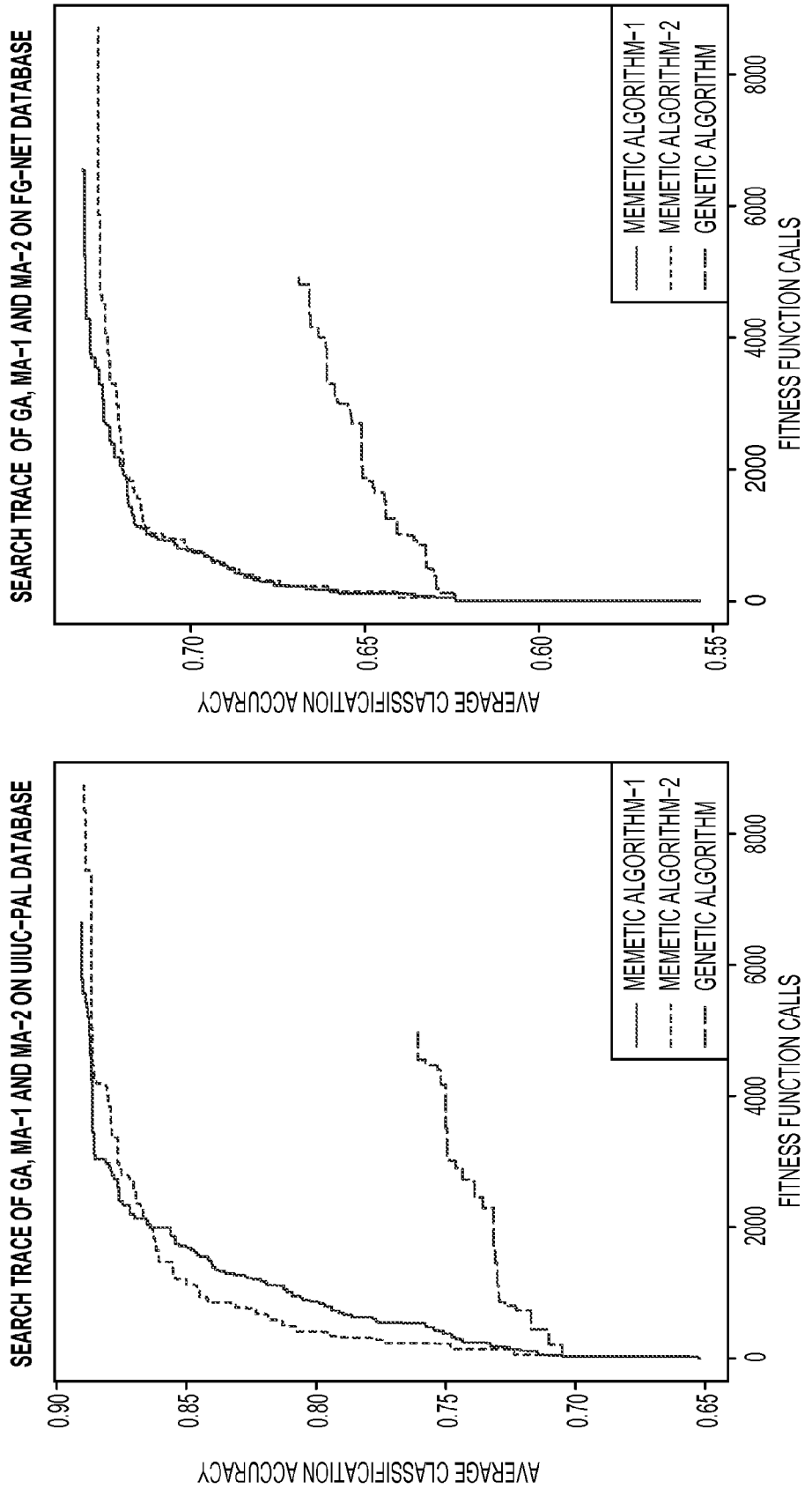
FIG. 24 illustrates searches for specific chromosomes on two different databases, in accordance with an example embodiment.

FIG. 24 shows the search traces of the first three proposed GA/MA feature selection approaches for both UIUC-PAL and FG-NET databases, where the horizontal axis shows the number of fitness function calls and the vertical axis shows the average classification rates. Each trace is the average of search traces from the 5-fold cross validation. Note that MA-1 and MA-2 curves are dominating the GA curve, which shows the local search does improve the performance of the feature selection. MA-1 performs as well as MA-2, although MA-2 performs a more aggressive local search at a higher computational cost.

Table VII, of FIG. 28, shows the results of gender classification rate on UIUC-PAL with 5-fold CV. The "PCA+Random Forest" approach achieves the best mean accuracy with the smallest standard deviation, while MA-1 and MA-2 achieve next best results. It is interesting that both MA approaches achieve very similar results. GA achieves the lowest accuracy within all four feature selection approaches.

Figure 29:
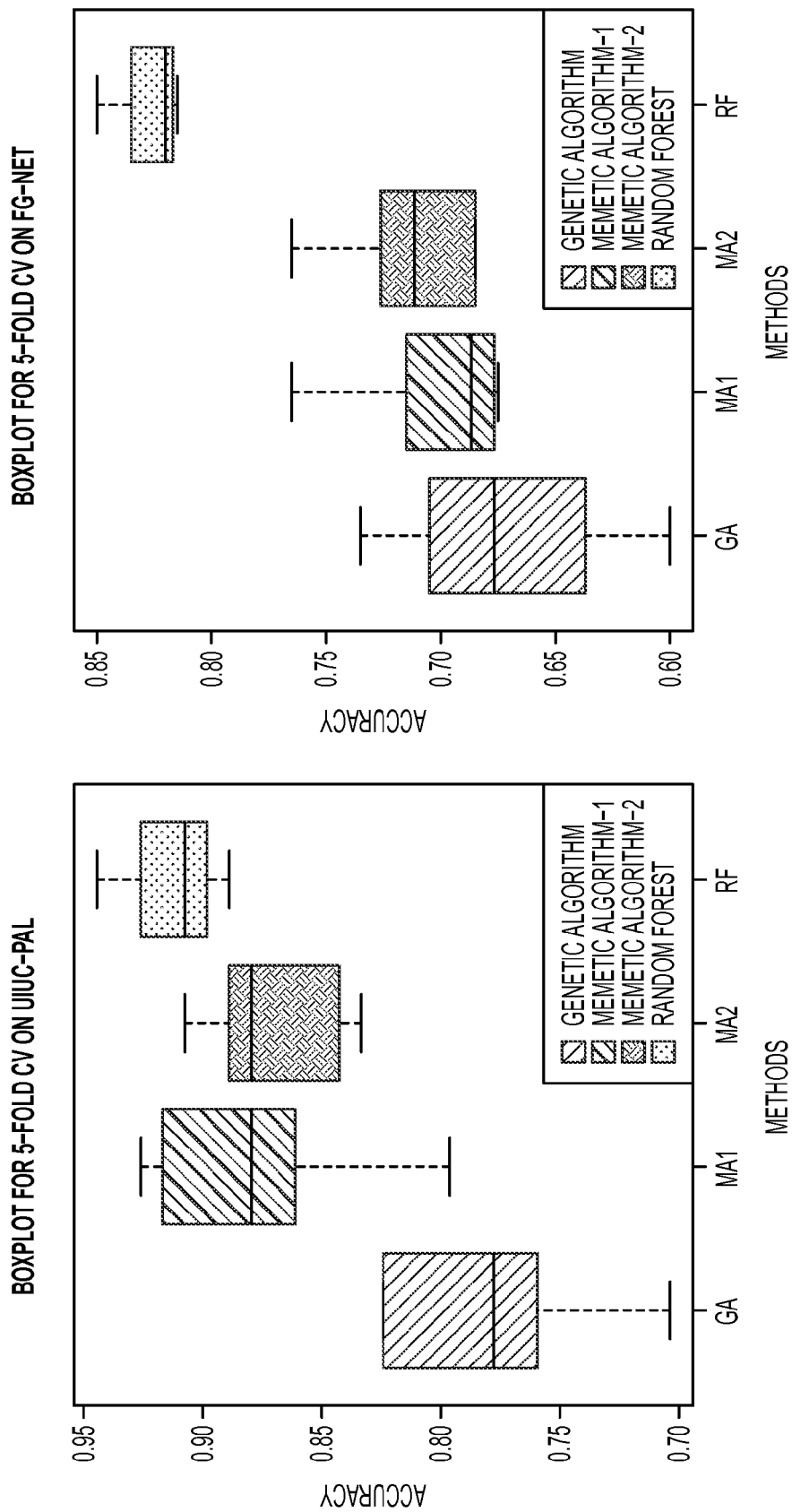
FIG. 29 are two box plots on two different databases, in accordance with an example embodiment.

FIG. 29 shows the Boxplots for the gender classification accuracies for 5-fold CV on UIUC-PAL and FG-NET databases. It gives us intuitive and useful ideas on how the classification rates from each cross validation spread out. For both datasets, it shows similar patterns that the "PCA+Random Forest" approach achieves the best performance with smallest variation. The Genetic Algorithm has the worse performance among four approaches. For the Memetic Algorithms, the performance varies between two datasets.

Table VIII of FIG. 30 presents the results of gender classification rate on FG-NET with 5-fold CV, comparing to the above obtained results. It shows a similar pattern in Table VII of FIG. 28 that the "PCA+Random Forest" approach achieves the best mean accuracy with the smallest standard deviation. All of GA/MAs approaches achieve similar results with small number of features needed. GA still achieves the lowest accuracy with all four feature selection approaches. However, all these proposed approaches work better than full feature model.

Based on all aforementioned detailed statistical analysis, for both FG-NET and UIUC-PAL databases, all three proposed genetic-type approaches GA, MA-1 and MA-2, are better than the full model. Additionally, among these three proposed approaches, MA-1 and MA-2 are better than GA, which corresponds to the strengths of local searches in Memetic Algorithms. The two Memetic Algorithms are very similar, while the greedy one (MA-2) takes longer computation time than the local search with improvement first strategy.

It is interesting to observe that when MA-1 and MA-2 are compared with "PCA+Random Forest" approach, both Memetic approaches use much less features (around seven). Additionally, Memetic approaches do not require careful and fine tunings. The SVM uses the default settings with the cost parameter C equal to 1, and the gamma parameter equal to 1/{number of selected features}.

However, MA results provide 5 different sets of features created during 5-fold cross validation. Using other techniques, exactly how many top features are used to build the SVM model for testing a new image is known. But this is not the case in MA as well as Random Forest because these five sets of features selected by MA or Random Forest may have completely different makeup. One conjecture is that those top features (i.e. those features appears most frequently in those five sets from 5-fold cross validation) may give the best features for gender classification.

To evaluate this conjecture on MA and Random Forest approaches, a cross domain testing experiment may be used. With the same feature extraction method, first the feature vectors are extracted for Noah-K dataset, and then used to evaluate the cross domain prediction error. In this experiment, the UIUC-PAL full data set is used for training and the Noah-K dataset is used for testing set. The top 6 features are selected from the MA model, and top 13 features are selected from "PCA+Random Forest" model.

To build the SVM model for the selected features, a grid search is used to identify the best tuning parameters C and gamma with C=1, 5, and 10 and gamma going from 0 to 1 with increment of 0.1. The second column in Table IX of FIG. 31 indicates the best tuning parameters for each model. Column 3 gives the best training results from UIUC-PAL database on 5-fold cross validation with selected features. Column 4 gives the cross domain testing results when using Noah-K data as testing set. The full model gives a 91.66% accuracy (55 correct classifications out of 60 instances). The MA model 96.67% (58 out of 60) with only 6 features. The "PCA-Random Forest" approach gives 95% (57 out of 60) with top 13 features. The MA result gives the best result with the least number of features. Comparing to Table VII, with selected features, a finer tuning can further improve to the gender classification abilities. The detailed misclassified images for the proposed approaches are shown in FIG. 32.

The effects of multiple feature selection approaches are investigated from the family of general genetic algorithms on gender classification problem. The experimental results show that proposed three approaches GA, MA-1 and MA-2 all perform well compare the original full feature space with only a small number of variables.

V. Example Operations

Figure 33:
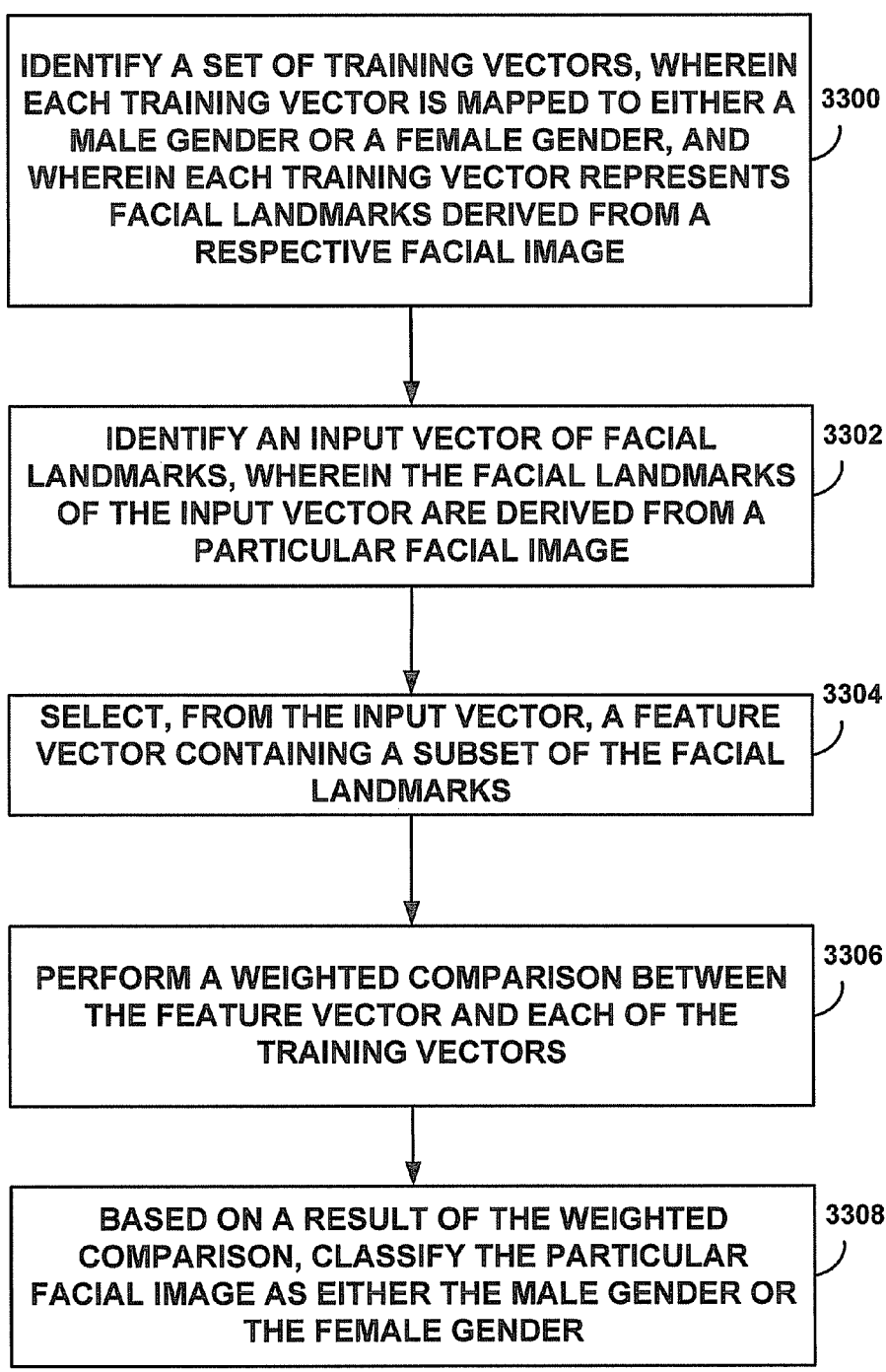
FIG. 33 is a flow chart, in accordance with an example embodiment.

FIG. 33 is a flow chart depicting an example embodiment. One or more steps of FIG. 33 may be carried out by a computing device exemplified by computing device 100 and/or a computing system.

At step 3300, a set of training vectors may be identified. Each training vector may be mapped to either a male gender or a female gender, and may represent facial landmarks derived from a respective facial image. At step 3302, an input vector of facial landmarks may be identified. The facial landmarks of the input vector may be derived from a particular facial image.

At step 3304, a feature vector containing a subset of the facial landmarks may be selected from the input vector. In some embodiments, the feature vector may be less than one-half the size of the input vector, or less than one-quarter the size of the input vector.

At step 3306, a weighted comparison may be performed between the feature vector and each of the training vectors. At step 3308, based on a result of the weighted comparison, the particular facial image may be classified as either the male gender or the female gender.

Alternatively or additionally, each training vector may be mapped to a specific race or ancestry group, and each training vector may represent facial landmarks derived from a respective facial image. Based on a result of the weighted comparison, the particular facial image may be classified as belonging to one or several race or ancestry group(s).

Selecting the feature vector may involve using a memetic algorithm to select the feature vector. The memetic algorithm may determine the fitness of a candidate feature vector based on a classification accuracy of a facial image associated with the candidate feature vector, and use a recombination process that produces a child feature vector of a size no greater than that of the each parent feature vector of the child feature vector.

Further, a non-selected feature vector may contain facial landmarks from one of the training vectors that are not in the candidate feature vector. Using the memetic algorithm may involve ranking the features in the candidate feature vector and the non-selected feature vector each in order of importance according to a univariate filter, and modifying the candidate feature vector by (i) adding the m highest-ranked features of the non-selected feature vector into the candidate feature vector, and (ii) removing the n lowest-ranked features from the candidate feature vector. Modification of the candidate feature vector may be performed for all m and n less than a particular value. A variation of the candidate feature vector for which the selected m and n result in a sufficiently high fitness as determined by the memetic algorithm may be selected as the feature vector.

In some implementations, selecting the feature vector may involve using a locality preserving projection to select the feature vector. Using the locality preserving projection may involve constructing a graph representing the training vectors. Each vertex in the graph may correspond to one of the training vectors, and each pair of vertices in the graph may be connected with a respective edge with a uniform weight if the associated training vectors map to the same gender. Using the locality preserving projection may also involve determining the feature vector based eigenvectors of an equation involving a training matrix representing the training vectors and an adjacency matrix of the graph.

Alternatively or additionally, selecting the feature vector may involve determining a training matrix representing the training vectors, determining a covariance matrix of the training matrix, and determining the feature vector based on an eigenvector of the covariance matrix. In some cases, the random forest technique may be used to (i) build a plurality of trees, where each node of each tree in the plurality of trees represents a random selection of the facial landmarks, (ii) calculate the Gini importance of the facial landmarks, and (iii) based on the calculated Gini importance, determine the feature vector.

VI. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
obtaining a set of training vectors, wherein each training vector is mapped to either a male gender or a female gender, and wherein the training vectors represent facial landmarks derived from respective facial images;
identifying, by a computing device, an input vector of facial landmarks, wherein the facial landmarks of the input vector are derived from a particular facial image;
selecting, by the computing device, a feature vector containing a subset of the facial landmarks of the input vector, wherein selecting the feature vector comprises: (i) constructing a graph representing the training vectors, each vertex in the graph corresponding to one of the training vectors, (ii) connecting pairs of vertices in the graph using respective uniform weight edges where the corresponding training vectors map to the same gender, (iii) determining a training matrix representing the training vectors, (iv) determining a covariance matrix of the training matrix, (v) using a random forest technique to build a plurality of trees, wherein each node of each tree in the plurality of trees represents a random selection of the facial landmarks, (vi) calculating the Gini importance of the facial landmarks and (vii) selecting the feature vector based on an adjacency matrix of the graph and the Gini importance of the facial landmarks; and
based on a weighted comparison between the feature vector and at least some of the training vectors, classifying, by the computing device, the particular facial image as either the male gender or the female gender.

2. The method of claim 1, wherein the feature vector is less than one-half the size of the input vector.

3. The method of claim 1, wherein the feature vector is less than one-quarter the size of the input vector.

4. The method of claim 1, wherein selecting the feature vector further comprises using a memetic algorithm to select the feature vector, wherein the memetic algorithm determines the fitness of a candidate feature vector based on a classification accuracy of a facial image associated with the candidate feature vector, and wherein the memetic algorithm uses a recombination process that produces a child feature vector of a size no greater than that of the each parent feature vector of the child feature vector.

5. The method of claim 4, wherein a non-selected feature vector contains facial landmarks from one of the training vectors that are not in the candidate feature vector, and wherein using the memetic algorithm comprises:
ranking the features in the candidate feature vector and the non-selected feature vector each in order of importance according to a univariate filter; and
modifying the candidate feature vector by adding the m highest-ranked features of the non-selected feature vector into the candidate feature vector, and removing the n lowest-ranked features from the candidate feature vector.

6. The method of claim 5, wherein modification of the candidate feature vector is performed for all m and n less than a particular value, and wherein a variation of the candidate feature vector for which the selected m and n result in a sufficiently high fitness as determined by the memetic algorithm is selected as the feature vector.

7. The method of claim 1, wherein selecting the feature vector is also based on eigenvectors of an equation involving a training matrix representing the training vectors.

8. The method of claim 1, wherein selecting the feature vector further comprises:
determining a training matrix representing the training vectors;
determining a covariance matrix of the training matrix; and
selecting the feature vector based on an eigenvector of the covariance matrix.

9. An article of manufacture including a non-transitory computer-readable medium, having stored thereon program instructions that, upon execution by a computing device, cause the computing device to perform operations comprising:
obtaining a set of training vectors, wherein each training vector is mapped to either a male gender or a female gender, and wherein the training vectors represent facial landmarks derived from respective facial images;
identifying an input vector of facial landmarks, wherein the facial landmarks of the input vector are derived from a particular facial image;
selecting a feature vector containing a subset of the facial landmarks of the input vector, wherein selecting the feature vector comprises: (i) constructing a graph representing the training vectors, each vertex in the graph corresponding to one of the training vectors, (ii) connecting pairs of vertices in the graph using respective uniform weight edges where the corresponding training vectors map to the same gender, (iii) determining a training matrix representing the training vectors, (iv) determining a covariance matrix of the training matrix, (v) using a random forest technique to build a plurality of trees, wherein each node of each tree in the plurality of trees represents a random selection of the facial landmarks, (vi) calculating the Gini importance of the facial landmarks and (vii) selecting the feature vector based on an adjacency matrix of the graph and the Gini importance of the facial landmarks; and based on a weighted comparison between the feature vector and at least some of the training vectors, classifying the particular facial image as either the male gender or the female gender.

10. The article of manufacture of claim 9, wherein selecting the feature vector further comprises using a memetic algorithm to select the feature vector, wherein the memetic algorithm determines the fitness of a candidate feature vector based on a classification accuracy of a facial image associated with the candidate feature vector, and wherein the memetic algorithm uses a recombination process that produces a child feature vector of a size no greater than that of the each parent feature vector of the child feature vector.

11. The article of manufacture of claim 10, wherein a non-selected feature vector contains facial landmarks from one of the training vectors that are not in the candidate feature vector, and wherein using the memetic algorithm comprises:

ranking the features in the candidate feature vector and the non-selected feature vector each in order of importance according to a univariate filter; and modifying the candidate feature vector by adding the m highest-ranked features of the non-selected feature vector into the candidate feature vector, and removing the n lowest-ranked features from the candidate feature vector.

12. The article of manufacture of claim 11, wherein modification of the candidate feature vector is performed for all m and n less than a particular value, and wherein a variation of the candidate feature vector for which the selected m and n result in a sufficiently high fitness as determined by the memetic algorithm is selected as the feature vector.

13. The article of manufacture of claim 9, wherein selecting the feature vector is also based on eigenvectors of an equation involving a training matrix representing the training vectors.

14. The article of manufacture of claim 9, wherein selecting the feature vector further comprises:

determining a training matrix representing the training vectors;

determining a covariance matrix of the training matrix; and selecting the feature vector based on an eigenvector of the covariance matrix.

15. A computing system comprising:

at least one processor;

memory; and program instructions, stored in the memory, that upon execution by the processor cause the computing system to perform operations including:

obtaining a set of training vectors, wherein each training vector is mapped to either a male gender or a female gender, and wherein the training vectors represent facial landmarks derived from respective facial images;

identifying an input vector of facial landmarks, wherein the facial landmarks of the input vector are derived from a particular facial image;

selecting a feature vector containing a subset of the facial landmarks of the input vector, wherein selecting the feature vector comprises: (i) constructing a graph representing the training vectors, each vertex in the graph corresponding to one of the training vectors, (ii) connecting pairs of vertices in the graph using respective uniform weight edges where the corresponding training vectors map to the same gender, (iii) determining a training matrix representing the training vectors, (iv) determining a covariance matrix of the training matrix, (v) using a random forest technique to build a plurality of trees, wherein each node of each tree in the plurality of trees represents a random selection of the facial landmarks, (vi) calculating the Gini importance of the facial landmarks and (vii) selecting the feature vector based on an adjacency matrix of the graph and the Gini importance of the facial landmarks; and based on a weighted comparison between the feature vector and at least some of the training vectors, classifying the particular facial image as either the male gender or the female gender.

16. The computing device of claim 15, wherein selecting the feature vector further comprises using a memetic algorithm to select the feature vector, wherein the memetic algorithm determines the fitness of a candidate feature vector based on a classification accuracy of a facial image associated with the candidate feature vector, and wherein the memetic algorithm uses a recombination process that produces a child feature vector of a size no greater than that of the each parent feature vector of the child feature vector.

17. The computing device of claim 16, wherein a non-selected feature vector contains facial landmarks from one of the training vectors that are not in the candidate feature vector, and wherein using the memetic algorithm comprises:

ranking the features in the candidate feature vector and the non-selected feature vector each in order of importance according to a univariate filter; and modifying the candidate feature vector by adding the m highest-ranked features of the non-selected feature vector into the candidate feature vector, and removing the n lowest-ranked features from the candidate feature vector.

18. The computing device of claim 17, wherein modification of the candidate feature vector is performed for all m and n less than a particular value, and wherein a variation of the candidate feature vector for which the selected m and n result in a sufficiently high fitness as determined by the memetic algorithm is selected as the feature vector.

* * * * *